US011117341B2

(12) United States Patent
Alef et al.

(10) Patent No.: US 11,117,341 B2
(45) Date of Patent: *Sep. 14, 2021

(54) METHOD OF PRODUCING A PACKAGING ENVELOPING CONTAINER PRECURSORS, ESPECIALLY EACH FOR A SINGLE DIMENSIONALLY STABLE FOODSTUFF CONTAINER, WITH FOLDING OVER OF THE CONTAINER PRECURSOR

(71) Applicant: SIG TECHNOLOGY AG, Neuhausen am Rheinfall (CH)

(72) Inventors: Ulrich Alef, Wegberg (DE); Eugen Berg, Linnich (DE); Richard Leufen, Linnich (DE); Christoph Wirtz, Linnich (DE)

(73) Assignee: SIG TECHNOLOGY AG, Neuhausen am Rheingall (CH)

( * ) Notice: Subject to any disclaimer, the term of this patent is extended or adjusted under 35 U.S.C. 154(b) by 194 days.

This patent is subject to a terminal disclaimer.

(21) Appl. No.: 16/304,748

(22) PCT Filed: May 24, 2017

(86) PCT No.: PCT/EP2017/062549
§ 371 (c)(1),
(2) Date: Nov. 27, 2018

(87) PCT Pub. No.: WO2017/202914
PCT Pub. Date: Nov. 30, 2017

(65) Prior Publication Data
US 2019/0299556 A1 Oct. 3, 2019

(30) Foreign Application Priority Data
May 27, 2016 (DE) .......................... 102016209236.7

(51) Int. Cl.
*B31B 50/26* (2017.01)
*B65B 3/02* (2006.01)
(Continued)

(52) U.S. Cl.
CPC ............ *B31B 50/262* (2017.08); *B65B 3/025* (2013.01); *B65B 43/10* (2013.01); *B65B 43/26* (2013.01);
(Continued)

(58) Field of Classification Search
CPC ....... B65B 3/025; B65B 43/10; B31B 50/262; B31B 2100/00; B65B 5/02; B65D 5/064;
(Continued)

(56) References Cited

U.S. PATENT DOCUMENTS 2,220,746 A * 11/1940 Wentz .................... B65D 5/443
229/213
2,379,038 A * 6/1945 Rous ...................... B65D 5/723
229/220

(Continued)

FOREIGN PATENT DOCUMENTS

DE 102004026690 B3 12/2005
JP 2010-168088 A 8/2010
(Continued)

OTHER PUBLICATIONS

International Search Report and Written Opinion issued in related International Application No. PCT/EP2017/062549 dated Sep. 7, 2017.
(Continued)

*Primary Examiner* — Anna K Kinsaul
*Assistant Examiner* — Daniel Jeremy Leeds
(74) *Attorney, Agent, or Firm* — Meunier Carlin & Curfman LLC

(57) ABSTRACT

A method for precursor production includes A) providing a multitude of container precursors, and in each case a)
(Continued)

providing a sheet-like composite, having a first longitudinal edge, a further longitudinal edge and, from the first longitudinal edge to the further longitudinal edge: i. a first longitudinal crease, ii. a second longitudinal crease, iii. a third longitudinal crease, and iv. a fourth longitudinal crease. The method includes b) producing a first longitudinal fold characterized by a first internal angle along the first longitudinal crease and a third longitudinal fold characterized by a third internal angle along the third longitudinal crease; c) producing a second longitudinal fold characterized by a second internal angle along the second longitudinal crease and a fourth longitudinal fold characterized by a fourth internal angle along the fourth longitudinal crease; d) contacting and joining the first longitudinal edge to the further longitudinal edge thereby obtaining a longitudinal seam.

6 Claims, 17 Drawing Sheets

(51) Int. Cl.
| | |
|---|---|
| *B65B 43/10* | (2006.01) |
| *B65B 43/26* | (2006.01) |
| *B65D 5/06* | (2006.01) |
| *B65D 5/42* | (2006.01) |
| *B65D 65/40* | (2006.01) |
| *B65D 65/42* | (2006.01) |
| *G01M 99/00* | (2011.01) |
| *B65D 5/02* | (2006.01) |
| *B31B 100/00* | (2017.01) |
| *B32B 29/00* | (2006.01) |

(52) U.S. Cl.
CPC ............... *B65D 5/02* (2013.01); *B65D 5/064* (2013.01); *B65D 5/4266* (2013.01); *B65D 65/40* (2013.01); *B65D 65/42* (2013.01); *G01M 99/007* (2013.01); *B31B 2100/00* (2017.08); *B32B 29/00* (2013.01)

(58) Field of Classification Search
CPC ...... B65D 5/4266; B65D 65/40; B65D 65/42; G01M 99/007; B32B 29/00
USPC ..................................................... 229/103.1
See application file for complete search history.

(56) References Cited

U.S. PATENT DOCUMENTS

| | | | | |
|---|---|---|---|---|
| 2,930,517 | A * | 3/1960 | Mensing | B65D 5/606 |
| | | | | 229/117.01 |
| 3,280,531 | A * | 10/1966 | Meyer-Jagenberg | |
| | | | | B65D 5/067 |
| | | | | 53/458 |
| 3,303,985 | A * | 2/1967 | Prokes | B65D 77/283 |
| | | | | 229/103.1 |
| 3,754,456 | A * | 8/1973 | Andrews | B29C 65/1432 |
| | | | | 493/274 |
| 3,884,131 | A * | 5/1975 | Palsson | B31B 50/00 |
| | | | | 493/135 |
| 4,410,128 | A * | 10/1983 | Rausing | B65D 5/065 |
| | | | | 229/216 |
| 4,446,971 | A * | 5/1984 | Wise | B65D 5/705 |
| | | | | 229/103.1 |
| 4,469,542 | A * | 9/1984 | Reil | B31F 1/10 |
| | | | | 156/203 |
| 4,516,382 | A * | 5/1985 | Nakajima | B65B 3/025 |
| | | | | 493/178 |
| 4,790,123 | A * | 12/1988 | Ljungstrom | B65B 65/02 |
| | | | | 53/458 |
| 5,482,202 | A * | 1/1996 | Wen | B65D 77/283 |
| | | | | 220/705 |
| 5,603,200 | A * | 2/1997 | Calvano | B65B 3/02 |
| | | | | 53/426 |
| 6,116,782 | A * | 9/2000 | Arkins | B32B 27/08 |
| | | | | 383/202 |
| 6,431,434 | B1 * | 8/2002 | Haughton | B65B 61/205 |
| | | | | 220/708 |
| 8,066,137 | B2 * | 11/2011 | Sanfilippo | B65B 1/06 |
| | | | | 220/6 |
| 8,602,242 | B2 * | 12/2013 | Sanfilippo | B65B 1/06 |
| | | | | 220/6 |
| 9,221,228 | B2 * | 12/2015 | Wolters | B65D 5/62 |
| 2007/0108259 | A1 * | 5/2007 | Daikyo | A47G 21/18 |
| | | | | 229/103.1 |
| 2014/0242311 | A1 * | 8/2014 | Wolters | B32B 3/266 |
| | | | | 428/35.7 |
| 2014/0260119 | A1 * | 9/2014 | Baltes | B65B 43/126 |
| | | | | 53/492 |
| 2015/0068163 | A1 | 3/2015 | Baltes et al. | |
| 2016/0332795 | A1 | 11/2016 | Mainz | |
| 2017/0320299 | A1 | 11/2017 | Alef et al. | |

FOREIGN PATENT DOCUMENTS

| | | |
|---|---|---|
| WO | 19900009926 A2 | 9/1990 |
| WO | 1991000827 A1 | 1/1991 |
| WO | 1998014317 A1 | 4/1998 |
| WO | 2016/001081 A | 1/2016 |

OTHER PUBLICATIONS

English Translation of Office Action issued for Japanese Application No. 2018-561958, dated May 14, 2021, 4 pages.

* cited by examiner

201

604,
701   702

1300 a) A-A b) B-B a)

b)

1300 a)

b)

METHOD OF PRODUCING A PACKAGING ENVELOPING CONTAINER PRECURSORS, ESPECIALLY EACH FOR A SINGLE DIMENSIONALLY STABLE FOODSTUFF CONTAINER, WITH FOLDING OVER OF THE CONTAINER PRECURSOR

FIELD OF THE DISCLOSURE

The present invention relates to a method comprising, as method steps,

A. providing a multitude of container precursors, wherein the providing of the container precursors in each case comprises:
  a) providing a sheet-like composite comprising, as mutually superposed layers of a layer sequence, from an inner face of the sheet-like composite to an outer face of the sheet-like composite
    i) an inner polymer layer,
    ii) a barrier layer, and
    iii) a carrier layer,
    wherein the sheet-like composite comprises a first longitudinal edge and a further longitudinal edge, wherein the first longitudinal edge lies opposite the further longitudinal edge, wherein the sheet-like composite comprises, in the following sequence from the first longitudinal edge to the further longitudinal edge:
      i. a first longitudinal crease,
      ii. a second longitudinal crease,
      iii. a third longitudinal crease, and
      iv. a fourth longitudinal crease;
  b) producing a first longitudinal fold along the first longitudinal crease and a third longitudinal fold along the third longitudinal crease, wherein the first longitudinal fold is characterized by a first angle, wherein the third longitudinal fold is characterized by a third angle;
  c) producing a second longitudinal fold along the second longitudinal crease and a fourth longitudinal fold along the fourth longitudinal crease, wherein the second longitudinal fold is characterized by a second angle, wherein the fourth longitudinal fold is characterized by a fourth angle;
  d) contacting and joining the first longitudinal edge to the further longitudinal edge thereby obtaining a longitudinal seam; and
  e) reducing the first angle and the third angle each to not more than 150 and increasing the second angle and the fourth angle each to at least 165°; and B. at least partly enveloping the multitude of container precursors with a packaging, wherein the first angle, the second angle, the third angle and the fourth angle are each on the inner face of the sheet-like composite. The invention further relates to a packaging obtainable by the method, to an apparatus and to a use of the apparatus.

BACKGROUND

For some time, foodstuffs, whether they be foodstuffs for human consumption or else animal feed products, have been conserved by storing them either in a can or in a jar closed by a lid. In this case, shelf life can be increased firstly by separately and as much as possible sterilizing the foodstuff and the container in each case, here the jar or can, and then introducing the foodstuff into the container and closing the container. However, these measures of increasing the shelf life of foodstuffs, which have been tried and tested over a long period, have a series of disadvantages, for example the need for another sterilization later on. Cans and jars, because of their essentially cylindrical shape, have the disadvantage that very dense and space-saving storage is not possible. Moreover, cans and jars have considerable intrinsic weight, which leads to increased energy expenditure in transport. In addition, production of glass, tinplate or aluminium, even when the raw materials used for the purpose are recycled, necessitates quite a high expenditure of energy. In the case of jars, an additional aggravating factor is increased expenditure on transport. The jars are usually prefabricated in a glass factory and then have to be transported to the facility where the foodstuffs are dispensed with utilization of considerable transport volumes. Furthermore, jars and cans can be opened only with considerable expenditure of force or with the aid of tools and hence in a rather laborious manner. In the case of cans, there is a high risk of injury emanating from sharp edges that arise on opening. In the case of jars, it is a regular occurrence that broken glass gets into the foodstuff in the course of filling or opening of the filled jars, which can lead in the worst case to internal injuries on consumption of the foodstuff. In addition, both cans and jars have to be labelled for identification and promotion of the foodstuff contents. The jars and cans cannot readily be printed directly with information and promotional messages. In addition to the actual printing, a substrate is thus needed for the purpose, a paper or suitable film, as is a securing means, an adhesive or sealant.

Other packaging systems are known from the prior art, in order to store foodstuffs over a long period with minimum impairment. These are containers produced from sheet-like composites—frequently also referred to as laminates. Sheet-like composites of this kind are frequently constructed from a thermoplastic plastic layer, a carrier layer usually consisting of cardboard or paper which imparts dimensional stability to the container, an adhesion promoter layer, a barrier layer and a further plastic layer, as disclosed inter alia in WO 90/09926 A2. Since the carrier layer imparts dimensional stability to the container manufactured from the laminate, these containers, in contrast to film bags, can be regarded as a further development of the aforementioned jars and cans.

In this context, these laminate containers already have many advantages over the conventional jars and cans. Nevertheless, there are also opportunities for improvement in the case of these packaging systems. For instance, container precursors are typically first produced from a laminate blank by a manufacturing method which includes folding and sealing. It has to be possible to transport and store these container precursors in a space-saving manner, and for this reason they are converted to a collapsed, flat state at the early stage of production. These flat-folded container precursors are used, in a further method, to produce containers, which are typically filled and closed in the course of this further method. The processing of the container precursor in the aforementioned further method proceeds in a very substantially automated manner. In this context, a particular aim is faultless running without delays. Faults in the running of the method lead to production of rejects, to production downtime and hence to rising costs, and to increased manual labour and hence also personnel demands in the production. It has been found that non-ideal shaping characteristics of the flat-folded container precursors in particular can result in the aforementioned faults in the running of production. These shaping characteristics of the flat-folded container precursor are determined to a crucial degree by the method by which the container precursor is formed from the laminate blank of the container precursors. The aim here is to optimally select various folding operations and to coordinate them to one another in the sequence such that a container precursor with suitable shaping characteristics can be obtained by forming a longitudinal seam. In the prior art, DE 10 2004 026 690 B3 teaches a conventional apparatus for folding of side flaps of the laminate blank. After folding, these side flaps are joined to one another to form the longitudinal seam. Thus, DE 10 2004 026 690 B3 specifically discloses a minimum degree of folding operations needed to enable the production of a longitudinal seam and hence a container precursor. The process according to the invention proceeds therefrom and improves on the prior art by means of further folding operations and the execution and mutual coordination thereof.

BRIEF SUMMARY OF THE DISCLOSURE

In general terms, it is an object of the present invention to at least partly overcome a drawback which arises from the prior art. It is a further object of the invention to provide a container precursor for laminate foodstuff containers, especially a packaging with a multitude of container precursors of this kind, which is notable for improved processability, preferably for improved shaping characteristics. It is a further object of the invention to provide a container precursor for laminate foodstuff containers, especially a packaging with a multitude of container precursors of this kind, which leads to fewer faults in container production, preferably in a filling machine. It is a further object of the invention to provide a container precursor, especially a packaging with a multitude of container precursors of this kind, which can reduce downtime of a filling machine. It is a further object of the invention to provide a container precursor for laminate foodstuff containers, especially a packaging with a multitude of container precursors of this kind, which can be shaped more reliably and with fewer faults and placed onto a mandrel wheel. It is a further object of the invention to provide a container precursor for laminate foodstuff containers which can be stacked in a maximum number in an outer packaging. It is a further object of the invention to provide a container precursor, especially a packaging with a multitude of container precursors of this kind, having a combination of the aforementioned advantages. It is a further object of the invention to provide a method of producing a container precursor, especially a packaging with a multitude of container precursors of this kind, having one of or a combination of several of the aforementioned advantages. It is a further object of the invention to reduce production faults and stoppages in container manufacture.

DETAILED DESCRIPTION

A contribution to at least partial achievement of at least one of the above objects is made by the independent claims. The dependent claims provide preferred embodiments which contribute to at least partial achievement of at least one of the objects.

A contribution to the achievement of at least one of the objects of the invention is made by an embodiment 1 of a method comprising, as method steps, A. providing a multitude of container precursors, wherein the providing of the container precursors in each case comprises:

a) providing a sheet-like composite comprising, as mutually superposed layers of a layer sequence, from an inner face of the sheet-like composite to an outer face of the sheet-like composite i) an inner polymer layer,
  ii) a barrier layer, and
  iii) a carrier layer,
  wherein the sheet-like composite comprises a first longitudinal edge and a further longitudinal edge, wherein the first longitudinal edge lies opposite the further longitudinal edge, wherein the sheet-like composite comprises, in the following sequence from the first longitudinal edge to the further longitudinal edge:
    i. a first longitudinal crease,
    ii. a second longitudinal crease,
    iii. a third longitudinal crease, and
    iv. a fourth longitudinal crease;

b) producing a first longitudinal fold along the first longitudinal crease and a third longitudinal fold along the third longitudinal crease, wherein the first longitudinal fold is characterized by a first angle, wherein the third longitudinal fold is characterized by a third angle;

c) producing a second longitudinal fold along the second longitudinal crease and a fourth longitudinal fold along the fourth longitudinal crease, wherein the second longitudinal fold is characterized by a second angle, wherein the fourth longitudinal fold is characterized by a fourth angle;

d) contacting and joining the first longitudinal edge to the further longitudinal edge thereby obtaining a longitudinal seam; and e) reducing the first angle and the third angle each to not more than 15°, preferably to not more than 10°, more preferably to not more than 8°, more preferably to not more than 5°, more preferably to not more than 3°, more preferably to not more than 1°, most preferably to 0°, and increasing the second angle and the fourth angle each to at least 165°, preferably to at least 170°, more preferably to at least 172°, more preferably to at least 174°, more preferably to at least 176°, more preferably to at least 178°, most preferably to 180°; and B. at least partly enveloping the multitude of container precursors with a packaging, wherein the first angle, the second angle, the third angle and the fourth angle are each on the inner face of the sheet-like composite. In this method, the production of the first longitudinal fold and the third longitudinal fold in method step b) may be successive, overlap in time or be simultaneous. In addition, the production of the second longitudinal fold and the fourth longitudinal fold in method step c) may be successive, overlap in time or be simultaneous.

Preferably, in method step d), a container precursor is obtained in a first flat-folded state. Further preferably, the container precursor is converted in method step e) to a further flat-folded state by folding along the first to fourth longitudinal creases. The conversion of the container precursor from the first flat-folded state to the further flat-folded state or from the further flat-folded state to the first flat-folded state is also referred to as folding over. Thus, method step e) preferably comprises a first folding over operation. The multitude of the container precursors preferably comprises at least 2, more preferably at least 10, more preferably at least 50, more preferably at least 100, most preferably at least 200, container precursors. In this connection, a packaging is an envelope which binds the container precursors of the multitude of container precursors spatially to one another to form a stack. A preferred packaging consists of one selected from the group consisting of cardboard, paperboard, paper and plastic, or a combination of at least two of these. A further preferred packaging is one selected from the group consisting of a box, a pouch, a bag, a can, a film, a vacuum packaging, a sleeve, a strip and a thread, or a combination of at least two of these.

In one embodiment 2 of the invention, the method is configured according to embodiment 1, wherein the method further comprises, between method steps e) and B., a method step f), wherein, in method step f), the first angle and the third angle are each increased to at least 165°, preferably to at least 170°, more preferably to at least 172°, more preferably to at least 174°, more preferably to at least 176°, more preferably to at least 178°, most preferably to 180°, and the second angle and the fourth angle are each reduced to not more than 15°, preferably to not more than 10°, more preferably to not more than 8°, more preferably to not more than 5°, more preferably to not more than 3°, more preferably to not more than 10, most preferably to 0°. Here, the container precursor obtained with preference in method step d) is preferably converted from the further flat-folded state to the first flat-folded state. Thus, method step f) preferably comprises a further folding over operation.

In one embodiment 3 of the invention, the method is configured according to embodiment 1 or 2, wherein the container precursors of the multitude of container precursors are each sleeve-like container precursors for an individual container.

In one embodiment 4 of the invention, the method is configured according to any of the preceding embodiments, wherein the production of the first longitudinal fold and of the third longitudinal fold in method step b) comprises reducing the first angle and the third angle each to not more than 65°, preferably to not more than 60°, more preferably to not more than 55°, most preferably to not more than 50°, and increasing the first angle and the third angle each to at least 165°, preferably to at least 170°, more preferably to at least 172°, more preferably to at least 174°, more preferably to at least 176°, more preferably to at least 178°, most preferably to 180°.

In one embodiment 5 of the invention, the method is configured according to any of the preceding embodiments, wherein the production of the second longitudinal fold and of the fourth longitudinal fold in method step c) comprises reducing the second angle and the fourth angle to not more than 15°, preferably to not more than 10°, more preferably to not more than 8°, more preferably to not more than 5°, more preferably to not more than 3°, more preferably to not more than 10, most preferably to 0°.

In one embodiment 6 of the invention, the method is configured according to any of the preceding embodiments, wherein the sheet-like composite further includes an outer polymer layer, wherein the outer polymer layer is superposed on the carrier layer on a side of the carrier layer remote from the barrier layer. Further preferably, the outer polymer layer is covered by an colour layer, preferably a decoration, on a side of the outer polymer layer remote from the carrier layer. The colour layer preferably comprises at least one colourant.

In one embodiment 7 of the invention, the method is configured according to any of the preceding embodiments, wherein the sheet-like composite is a blank for production of a single container.

In one embodiment 8 of the invention, the method is configured according to any of the preceding embodiments, wherein the method comprises, as method sub-steps of method step a), I. providing a sheet-like composite precursor comprising, as mutually superposed layers of a layer sequence, from an inner face of the sheet-like composite precursor to an outer face of the sheet-like composite precursor
  i) the inner polymer layer,
  ii) the barrier layer, and
  iii) the carrier layer; and
II. creasing the sheet-like composite precursor thereby obtaining the sheet-like composite.

A preferred creasing in method sub-step II is effected with a creasing tool.

In one embodiment 9 of the invention, the method is configured according to embodiment 8, wherein the sheet-like composite precursor is a blank for manufacture of a single container.

In one embodiment 10 of the invention, the method is configured according to any of the preceding embodiments, wherein the carrier layer of the sheet-like composite comprises an oriented material, wherein the oriented material is characterized by a direction of orientation, wherein the direction of orientation forms an angle of orientation with a longitudinal crease selected from the group consisting of the first longitudinal crease, the second longitudinal crease, the third longitudinal crease and the fourth longitudinal crease, or with a combination of at least two thereof, wherein the angle of orientation is in a range from 60 to 120°, preferably from 70 to 110°, more preferably from 75 to 105°, more preferably from 80 to 100°, most preferably from 85 to 95°. A preferred oriented material is one selected from the group consisting of cardboard, paperboard and paper or a combination of at least two thereof. A preferred direction of orientation is a direction of a majority of fibres of the oriented material. The carrier layer preferably consists of the oriented material.

In one embodiment 11 of the invention, the method is configured according to any of the preceding embodiments, wherein, in method step e), the carrier layer is split along the first longitudinal crease or the third longitudinal crease or both into at least 2, preferably at least 3, more preferably at least 4, sublayers at least partly separated from one another.

In one embodiment 12 of the invention, the method is configured according to any of embodiments 2 to 11, wherein, in method step f), the carrier layer is split along the second longitudinal crease or the fourth longitudinal crease or both into at least 2, preferably at least 3, more preferably 4, sublayers at least partly separated from one another.

In one embodiment 13 of the invention, the method is configured according to any of the preceding embodiments, wherein, in method step e), a cavity is produced in the carrier layer along the first longitudinal crease or the third longitudinal crease or both.

In one embodiment 14 of the invention, the method is configured according to any of embodiments 2 to 13, wherein, in method step f), a cavity is produced in the carrier layer along the second longitudinal crease or the fourth longitudinal crease or both.

In one embodiment 15 of the invention, the method is configured according to any of the preceding embodiments, wherein the barrier layer comprises, preferably consists of, one selected from the group consisting of a plastic, a metal and a metal oxide, or a combination of at least two thereof.

In one embodiment 16 of the invention, the method is configured according to any of the preceding embodiments, wherein the inner polymer layer comprises a polymer prepared by means of a metallocene catalyst to an extent of 10% to 90% by weight, preferably to an extent of 25% to 90% by weight, more preferably to an extent of 30% to 80% by weight, based on the total weight of the inner polymer layer.

In one embodiment 17 of the invention, the method is configured according to any of embodiments 1 to 15, wherein the inner polymer layer comprises a polymer prepared using a metallocene catalyst to an extent of 10% to 90% by weight, preferably to an extent of 25% to 90% by weight, more preferably to an extent of 30% to 80% by weight, based on the total weight of the inner polymer layer.

In one embodiment 18 of the invention, the method is configured according to any of the preceding embodiments, wherein the carrier layer comprises, preferably consists of, one selected from the group consisting of cardboard, paperboard and paper, or a combination of at least two thereof.

In one embodiment 19 of the invention, the method is configured according to any of the preceding embodiments, wherein the carrier layer has at least one hole, wherein the hole is covered at least by the barrier layer and at least by the inner polymer layer as hole-covering layers.

A contribution to the fulfilment of at least one of the objects of the invention is made by an embodiment 1 of a packaging at least partly enveloping a multitude of container precursors obtainable by the method according to any of embodiments 1 to 19. A preferred container precursor takes the form of a sleeve. In contrast to the container precursor in the form of a sleeve, what is known in the prior art is a container precursor in the form of a tube. With regard to the configuration of the packaging, what was taught in connection with the method of the invention is applicable.

A further contribution to the fulfilment of at least one of the objects of the invention is made by an arrangement, comprising the packaging according to the invention and the multitude of container precursors, obtainable by the method according to any of embodiments 1 to 19, the multitude of container precursors being at least partly enveloped by the packaging.

In one embodiment 2 of the invention, the packaging is configured according to embodiment 1, wherein the first angle and the third angle of at least a portion of the container precursors of the multitude of container precursors are each at least 165°, preferably at least 170°, more preferably at least 172°, more preferably at least 174°, more preferably at least 176°, more preferably at least 178°, most preferably 180°; wherein the second angle and the fourth angle of at least the portion of the container precursors of the multitude of container precursors are each not more than 15°, preferably not more than 10°, more preferably not more than 8°, more preferably not more than 5°, more preferably not more than 3°, more preferably not more than 1°, most preferably 0°; wherein the container precursors of the portion of the container precursors can each be shaped by folding along the first longitudinal crease, the second longitudinal crease, the third longitudinal crease and the fourth longitudinal crease to give a sleeve structure; wherein the container precursors of the portion of the container precursors are each characterized by a shaping coefficient according to the test method described herein in a range from 8 to 30 $m^2/kg$, preferably from 8.5 to 28 $m^2/kg$, more preferably from 9 to 27 $m^2/kg$, more preferably from 9.5 to 26.5 $m^2/kg$, most preferably from 10 to 26.5 $m^2/kg$.

Preferably, the first to fourth angles have been obtained as described above by the method according to any of embodiments 2 to 19 of the method according to the invention and not altered thereafter by more than 1°, preferably not by more than 0.5°. Accordingly, the first to fourth angles, after manufacture of the container precursor according to any of embodiments 2 to 19 of the method according to the invention, have preferably not been manipulated by folding. The container precursor is preferably folded flat, wherein the container precursor preferably has a thickness of less than 10 mm, more preferably less than 8 mm, more preferably less than 5 mm, most preferably less than 4 mm. Further preferably, the container precursor is in one-piece form.

In one embodiment 3 of the invention, the packaging is configured according to embodiment 1, wherein the first angle and the third angle of at least a portion of the container precursors of the multitude of container precursors are each not more than 15°, preferably not more than 10°, more preferably not more than 8°, more preferably not more than 5°, more preferably not more than 3°, more preferably not more than 1°, most preferably 0°; wherein the second angle and the fourth angle of at least the portion of the container precursors of the multitude of container precursors are each at least 165°, preferably at least 170°, more preferably at least 172°, more preferably at least 174°, more preferably at least 176°, more preferably at least 178°, most preferably 180°; wherein each of the container precursors of the portion of the container precursors can be shaped by folding along the first longitudinal crease, the second longitudinal crease, the third longitudinal crease and the fourth longitudinal crease to give a sleeve-like structure; wherein the container precursor is characterized by a shaping coefficient according to the test method described herein in a range from 8 to 30 $m^2/kg$, preferably from 8.5 to 28 $m^2/kg$, more preferably from 9 to 27 $m^2/kg$, more preferably from 9.5 to 26.5 $m^2/kg$, most preferably of 10 to 26.5 $m^2/kg$.

Preferably, the first to fourth angles, as described above, are obtained by the method according to any of embodiments 1 to 19 of the method of the invention and thereafter are altered by not more than 1°, preferably not more than 0.5°. Accordingly, the first to fourth angles, after production of the container precursor according to any of embodiments 1 to 19 of the method of the invention, have preferably not been manipulated by folding. The container precursor is preferably folded flat, the container precursor preferably having a thickness of less than 10 mm, preferably less than 8 mm, more preferably less than 5 mm, most preferably less than 4 mm. Further preferably, the container precursor is in one-piece form.

A contribution to the fulfilment of at least one of the objects of the invention is made by an embodiment 1 of an apparatus comprising, as constituents,
  a) a sheet-like composite comprising, as mutually superposed layers of a layer sequence, from an inner face of the sheet-like composite to an outer face of the sheet-like composite
    i) an inner polymer layer,
    ii) a barrier layer, and
    iii) a carrier layer,
    wherein the sheet-like composite comprises a first longitudinal edge and a further longitudinal edge, wherein the first longitudinal edge lies opposite the further longitudinal edge, wherein the sheet-like composite comprises, in the following sequence from the first longitudinal edge to the further longitudinal edge:
      i. a first longitudinal crease,
      ii. a second longitudinal crease,
      iii. a third longitudinal crease, and
      iv. a fourth longitudinal crease;
  b) a transport unit designed to transport the sheet-like composite in a transport direction;
  c) a first folding station designed to produce a first longitudinal fold along the first longitudinal crease and a third longitudinal fold along the third longitudinal crease, wherein the first longitudinal fold is characterized by a first angle, wherein the third longitudinal fold is characterized by a third angle;

d) a second folding station designed to produce a second longitudinal fold along the second longitudinal crease and a fourth longitudinal fold along the fourth longitudinal crease, wherein the second longitudinal fold is characterized by a second angle,
wherein the fourth longitudinal fold is characterized by a fourth angle, wherein the second folding station is arranged beyond the first folding station in the transport direction;

e) a longitudinal seam-forming station designed to contact and join the first longitudinal edge to the further longitudinal edge thereby obtaining a longitudinal seam, wherein the longitudinal seam-forming station is arranged beyond the second folding station in the transport direction; and f) a first flat-folding station designed to reduce the first angle and the third angle each to not more than 15°, preferably to not more than 10°, more preferably to not more than 8°, more preferably to not more than 5°, more preferably to not more than 3°, more preferably to not more than 1°, most preferably to 0°, and to increase the second angle and the fourth angle each to at least 165°, preferably to at least 170°, more preferably to at least 172°, more preferably to at least 174°, more preferably to at least 176°, more preferably to at least 178°, most preferably to 180°, wherein the first flat-folding station is arranged beyond the longitudinal seam-forming station in the transport direction, wherein the first angle, the second angle, the third angle and the fourth angle are each on the inner face of the sheet-like composite. A preferred transport direction at least partly takes the form of a conveyor belt or a roll conveyor or both. A preferred longitudinal seam-forming station is a sealing station, preferably designed for sealing as described herein.

In one embodiment 2 of the invention, the apparatus is configured according to embodiment 1, wherein the apparatus further comprises a second flat-folding station designed to increase the first angle and the third angle each to at least 165°, preferably to at least 170°, more preferably to at least 172°, more preferably to at least 174°, more preferably to at least 176°, more preferably to at least 178°, most preferably to 180°, and to reduce the second angle and the fourth angle each to not more than 15°, preferably to not more than 10°, more preferably to not more than 8°, more preferably to not more than 5°, more preferably to not more than 3°, more preferably to not more than 1°, most preferably to 0°, wherein the second flat-folding station is arranged beyond the first flat-folding station in the transport direction.

In one embodiment 3 of the invention, the apparatus is configured according to embodiment 1 or 2, wherein the first folding station or the second folding station or each of them at least partly comprises at least 2 belts, wherein the belts each rotate about their longitudinal axis along the transport direction. A preferred belt is a continuous revolving belt.

In one embodiment 4 of the invention, the apparatus is configured according to any of embodiments 1 to 3, wherein the first flat-folding station or the second flat-folding station or each of them includes one, preferably two, rotating roll(s). Preferably, the first flat-folding station or the second flat-folding station or each of them includes two contra-rotating rolls, the rolls being arranged and designed to press a longitudinal fold of the sheet-like composite. Further preferably, the first flat-folding station or the second flat-folding station or each of them comprises two pairs of contra-rotating rolls, the rolls of any pair being arranged and designed to press a longitudinal fold of the sheet-like composite.

In one embodiment 5 of the invention, the apparatus is configured according to any of embodiments 1 to 4, wherein a longitudinal crease selected from the group consisting of the first longitudinal crease, the second longitudinal crease, the third longitudinal crease and the fourth longitudinal crease, or a combination of at least two thereof, forms an angle with the transport direction in a range from 0 to 30°, preferably from 0 to 20°, more preferably from 0 to 15°, more preferably from 0 to 10°, more preferably from 0 to 7°, more preferably from 0 to 5°, most preferably from 0 to 3°.

In one embodiment 6 of the invention, the apparatus is configured according to any of embodiments 1 to 5, wherein the carrier layer of the sheet-like composite comprises an oriented material, wherein the oriented material is characterized by a direction of orientation, wherein the direction of orientation forms an angle with the transport direction in a range from 60 to 120°, preferably from 70 to 110°, more preferably from 75 to 105°, more preferably from 80 to 100°, most preferably from 85 to 95°. A preferred oriented material is one selected from the group consisting of cardboard, paperboard and paper or a combination of at least two of these. A preferred direction of orientation is a direction of a majority of fibres of the oriented material. The carrier layer preferably consists of the oriented material.

In one embodiment 7 of the invention, the apparatus is configured according to any of embodiments 1 to 6, wherein the first folding station is designed to reduce the first angle and the third angle each to not more than 65°, preferably to not more than 60°, more preferably to not more than 55°, most preferably to not more than 50°.

In one embodiment 8 of the invention, the apparatus is configured according to any of embodiments 1 to 7, wherein the second folding station is designed to reduce the second angle and the fourth angle each to not more than 15°, preferably to not more than 10°, more preferably to not more than 8°, more preferably to not more than 5°, more preferably to not more than 3°, more preferably to not more than 1°, most preferably to 0°.

A contribution to the fulfilment of at least one of the objects of the invention is made by an embodiment 1 of a use of the apparatus according to any of embodiments 1 to 8 for production of a container precursor.

Features described as preferred in one category of the invention are likewise preferred in any embodiment of the further categories of the invention.

Layers

Two layers have been joined to one another when their adhesion to one another extends beyond van der Waals attraction forces. Layers joined to one another are preferably layers selected from the group consisting of mutually sealed, mutually glued and mutually compressed layers, or a combination of at least two thereof. Unless stated otherwise, in a layer sequence, the layers may follow one another indirectly, i.e. with one or at least two interlayers, or directly, i.e. without an interlayer. This is especially the case in the wording in which one layer superposes another layer. A wording in which a layer sequence comprises enumerated layers means that at least the layers specified are present in the sequence specified. This wording does not necessarily mean that these layers directly follow one another. A wording in which two layers adjoin one another means that these two layers follow one another directly and hence without an interlayer. However, this wording does not make any stipulation as to whether the two layers are joined to one another or not. Instead, these two layers may be in contact with one another.

Polymer Layers

The term "polymer layer" hereinafter relates especially to the inner polymer layer and the outer polymer layer, more preferably to the inner polymer layer. A preferred polymer, especially for the inner polymer layer, is a polyolefin. The polymer layers may include further constituents. The polymer layers are preferably introduced into or applied to the sheet-like composite material in an extrusion process. The further constituents of the polymer layers are preferably constituents that do not adversely affect the behaviour of the polymer melt on application as a layer. The further constituents may, for example, be inorganic compounds such as metal salts or further polymers such as further thermoplastics. However, it is also conceivable that the further constituents are fillers or pigments, for example carbon black or metal oxides. Suitable thermoplastics for the further constituents especially include those that are easily processable by virtue of good extrusion characteristics. Among these, polymers obtained by chain polymerization are suitable, especially polyesters or polyolefins, particular preference being given to cyclic olefin copolymers (COCs), polycyclic olefin copolymers (POCs), especially polyethylene and polypropylene, and very particular preference to polyethylene. Among the polyethylenes, HDPE (high density polyethylene), MDPE (medium density polyethylene), LDPE (low density polyethylene), LLDPE (linear low density polyethylene), VLDPE (very low density polyethylene) and PE (polyethylene) and mixtures of at least two thereof are preferred. It is also possible to use mixtures of at least two thermoplastics. Suitable polymer layers have a melt flow rate (MFR) in a range from 1 to 25 g/10 min, preferably in a range from 2 to 20 g/10 min and especially preferably in a range from 2.5 to 15 g/10 min, and a density in a range from 0.890 g/cm$^3$ to 0.980 g/cm$^3$, preferably in a range from 0.895 g/cm$^3$ to 0.975 g/cm$^3$, and further preferably in a range from 0.900 g/cm$^3$ to 0.970 g/cm$^3$. The polymer layers preferably have at least one melting temperature in a range from 80 to 155° C., preferably in a range from 90 to 145° C. and especially preferably in a range from 95 to 135° C. Preferably, the sheet-like composite comprises, between the barrier layer and the carrier layer, a polymer layer, preferably a polyolefin layer, preferably a polyethylene layer. Further preferably, the composite precursor comprises, between the barrier layer and the carrier layer, a polymer layer, preferably a polyolefin layer, preferably a polyethylene layer. The above remarks relating to the polymer layers also apply to these polymer layers, also called adhesion promoter layers herein, of the composite and the composite precursor.

Inner Polymer Layer

The inner polymer layer is based on thermoplastic polymers, and the inner polymer layer may include a particulate inorganic solid. It is preferable, however, that the inner polymer layer comprises a thermoplastic polymer to an extent of at least 70% by weight, preferably at least 80% by weight and especially preferably at least 95% by weight, based in each case on the total weight of the inner polymer layer. It is further preferable that the inner polymer layer comprises at least 30% by weight, especially preferably at least 40% by weight and most preferably at least 50% by weight, based in each case on the total weight of the inner polymer layer, of a polyolefin prepared by means of a metallocene catalyst, preferably a polyethylene prepared by means of a metallocene catalyst (mPE). Further preferably, the inner polymer layer comprises an mLLDPE (linear low density polyethylene prepared by means of a metallocene catalyst).

Preferably, the polymer or polymer mixture of the inner polymer layer has a density (according to ISO 1183-1:2004) in a range from 0.900 to 0.930 g/cm$^3$, especially preferably in a range from 0.900 to 0.920 g/cm$^3$ and most preferably in a range from 0.900 to 0.910 g/cm$^3$. The MFR (ISO 1133, 190° C./2.16 kg) is preferably in a range from 4 to 17 g/10 min, especially preferably in a range from 4.5 to 14 g/10 min and most preferably in a range from 6.5 to 10 g/10 min.

Carrier Layer

The carrier layer used may be any material which is suitable for a person skilled in the art for this purpose and which has sufficient strength and stiffness to impart stability to the container to such an extent that the container in the filled state essentially retains its shape. This is, in particular, a necessary feature of the carrier layer since the invention relates to the technical field of dimensionally stable containers. As well as a number of plastics, preference is given to plant-based fibrous materials, especially pulps, preferably sized, bleached and/or unbleached pulps, paper and cardboard being especially preferred. The grammage of the carrier layer is preferably in a range from 120 to 450 g/m$^2$, especially preferably in a range from 130 to 400 g/m$^2$ and most preferably in a range from 150 to 380 g/m$^2$. A more preferred cardboard generally has a single-layer or multilayer structure and may have been coated on one or both sides with one or else more than one cover layer. In addition, a preferred cardboard has a residual moisture content of less than 20% by weight, preferably of 2% to 15% by weight and especially preferably of 4% to 10% by weight, based on the total weight of the cardboard. A particularly preferred cardboard has a multilayer structure. Further preferably, the cardboard has, on the surface facing the environment, at least one lamina, but more preferably at least two laminas, of a cover layer known to the person skilled in the art as a "paper coating". In addition, a more preferred cardboard has a Scott bond value in a range from 100 to 360 J/m$^2$, preferably from 120 to 350 J/m$^2$ and especially preferably from 135 to 310 J/m$^2$. By virtue of the aforementioned ranges, it is possible to provide a composite from which it is possible to fold a container with high integrity, easily and in low tolerances.

Barrier Layer

The barrier layer used may be any material which is suitable for a person skilled in the art for this purpose and which has sufficient barrier action, especially with respect to oxygen. The barrier layer is preferably selected from a. a plastic barrier layer;
 b. a metal layer;
 c. a metal oxide layer; or
 d. a combination of at least two from a. to c.

If the barrier layer, according to alternative a., is a plastic barrier layer, this preferably comprises at least 70% by weight, especially preferably at least 80% by weight and most preferably at least 95% by weight of at least one plastic which is known to the person skilled in the art for this purpose, especially for aroma or gas barrier properties suitable for packaging containers. Useful plastic, especially thermoplastics, here include N- or O-bearing plastic, either alone or in mixtures of two or more. According to the invention, it may be found to be advantageous when the plastic barrier layer has a melting temperature in a range from more than 155 to 300° C., preferably in a range from 160 to 280° C. and especially preferably in a range from 170 to 270° C.

Further preferably, the polymer barrier layer has a grammage in a range from 2 to 120 g/m², preferably in a range from 3 to 60 g/m², especially preferably in a range from 4 to 40 g/m² and further preferably from 6 to 30 g/m². Further preferably, the plastic barrier layer is obtainable from melts, for example by extrusion, especially laminar extrusion. Further preferably, the plastic barrier layer may also be introduced into the sheet-like composite via lamination. It is preferable in this context that a film is incorporated into the sheet-like composite. In another embodiment, it is also possible to select plastic barrier layers obtainable by deposition from a solution or dispersion of p plastics.

Suitable polymers preferably include those having a weight-average molecular weight, determined by gel permeation chromatography (GPC) by means of light scattering, in a range from $3 \times 10^3$ to $1 \cdot 10^7$ g/mol, preferably in a range from $5 \cdot 10^3$ to $1 \cdot 10^6$ g/mol and especially preferably in a range from $6 \cdot 10^3$ to $1 \cdot 10^5$ g/mol. Suitable polymers especially include polyamide (PA) or polyethylene vinyl alcohol (EVOH) or a mixture thereof.

Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two thereof, particular preference being given to PA 6 and PA 6.6 and further preference to PA 6. PA 6 is commercially available, for example, under the Akulon®, Durethan® and Ultramid® trade names. Additionally suitable are amorphous polyamides, for example MXD6, Grivory® and Selar® PA. It is further preferable that the PA has a density in a range from 1.01 to 1.40 g/cm³, preferably in a range from 1.05 to 1.30 g/cm³ and especially preferably in a range from 1.08 to 1.25 g/cm³. It is further preferable that the PA has a viscosity number in a range from 130 to 185 ml/g and preferably in a range from 140 to 180 ml/g.

Useful EVOHs include all the EVOHs that seem suitable to the person skilled in the art for the use according to the invention. Examples of these are commercially available, inter alia, under the EVAL™ trade names from EVAL Europe NV, Belgium, in a multitude of different versions, for example the EVAL™ F104B or EVALT LR171B types. Preferred EVOHs have at least one, two, more than two or all of the following properties:
  an ethylene content in a range from 20 to 60 mol %, preferably from 25 to 45 mol %;
  a density in a range from 1.0 to 1.4 g/cm³, preferably from 1.1 to 1.3 g/cm³;
  a melting point in a range from more than 155 to 235° C., preferably from 165 to 225° C.;
  an MFR value (210° C./2.16 kg when $T_{S(EVOH)}$<230° C.; 230° C./2.16 kg when 210° C.<$T_{S(EVOH)}$<230° C.) in a range from 1 to 25 g/10 min, preferably from 2 to 20 g/10 min;
  an oxygen permeation rate in a range from 0.05 to 3.2 cm³·20 μm/m²·day·atm, preferably in a range from 0.1 to 1 cm³·20 μm/m²·day·atm.

Preferably at least one polymer layer, further preferably the inner polymer layer, or preferably all polymer layers, have a melting temperature below the melting temperature of the barrier layer. This is especially true when the barrier layer is formed from polymer. In this case, the melting temperatures of the at least one polymer layer, especially the inner polymer layer, and the melting temperature of the barrier layer differ preferably by at least 1 K, especially preferably by at least 10 K, even more preferably by at least 50 K, further preferably at least 100 K. The temperature difference should preferably be chosen only such that it is sufficiently high that there is no melting of the barrier layer, especially no melting of the plastic barrier layer, during the folding.

According to alternative b., the barrier layer is a metal layer. Suitable metal layers are in principle all layers comprising metals which are known to the person skilled in the art and which can provide high light opacity and oxygen impermeability. In a preferred embodiment, the metal layer may take the form of a foil or a deposited layer, for example after a physical gas phase deposition. The metal layer is preferably an uninterrupted layer. In a further preferred embodiment, the metal layer has a thickness in a range from 3 to 20 μm, preferably in a range from 3.5 to 12 μm and especially preferably in a range from 4 to 10 μm. Metals selected with preference are aluminium, iron or copper. A preferred iron layer may be a steel layer, for example in the form of a foil. Further preferably, the metal layer is a layer comprising aluminium. The aluminium layer may appropriately consist of an aluminium alloy, for example AlFeMn, AlFe1.5Mn, AlFeSi or AlFeSiMn. The purity is typically 97.5% or higher, preferably 98.5% or higher, based in each case on the overall aluminium layer. In a preferred configuration, the metal layer consists of an aluminium foil. Suitable aluminium foils have a ductility of more than 1%, preferably of more than 1.3% and especially preferably of more than 1.5%, and a tensile strength of more than 30 N/mm², preferably more than 40 N/mm² and especially preferably more than 50 N/mm². Suitable aluminium foils in the pipette test show a droplet size of more than 3 mm, preferably more than 4 mm and especially preferably of more than 5 mm. Suitable alloys for creation of aluminium layers or foils are commercially available under the EN AW 1200, EN AW 8079 or EN AW 8111 names from Hydro Aluminium Deutschland GmbH or Amcor Flexibles Singen GmbH. In the case of a metal foil as barrier layer, it is possible to provide an adhesion promoter layer between the metal foil and a closest polymer layer on one or both sides of the metal foil.

Further preferably, the barrier layer selected, according to alternative c., may be a metal oxide layer. Useful metal oxide layers include all metal oxide layers that are familiar and seem suitable to the person skilled in the art, in order to achieve a barrier effect with respect to light, vapour and/or gas. Especially preferred are metal oxide layers based on the metals already mentioned above, aluminium, iron or copper, and those metal oxide layers based on titanium oxide or silicon oxide compounds. A metal oxide layer is produced by way of example by vapour deposition of metal oxide on a polymer layer, for example an oriented polypropylene film. A preferred method for this purpose is physical gas phase deposition.

In a further preferred embodiment, the metal layer of the metal oxide layer may take the form of a layer composite composed of one or more polymer layers with a metal layer. Such a layer is obtainable, for example, by vapour deposition of metal on a polymer layer, for example an oriented polypropylene film. A preferred method for this purpose is physical gas phase deposition.

Outer Surface

The outer surface of the sheet-like composite is a surface of a lamina of the sheet-like composite which is intended to be in contact with the environment of the container in a container which is to be produced from the sheet-like composite. This does not contradict, outer surfaces of various regions of the composite being folded against one another or joined to one another, for example being sealed to one another, in individual regions of the container.

Inner Surface

The inner surface of the sheet-like composite is a surface of a lamina of the sheet-like composite which is intended to be in contact with the contents of the container, preferably a foodstuff, in a container to be produced from the sheet-like composite.

Colourant

According to DIN 55943:2001-10, colourant is the collective term for all colouring substances, especially for dyes and pigments. A preferred colourant is a pigment. A preferred pigment is an organic pigment. Pigments that are notable in connection with the invention are especially the pigments mentioned in DIN 55943:2001-10 and those mentioned in "Industrial Organic Pigments, Third Edition" (Willy Herbst, Klaus Hunger Copyright® 2004 WILEY-VCH Verlag GmbH & Co. KGaA, Weinheim ISBN: 3-527-30576-9).

Adhesion/Adhesion Promoter Layer

An adhesion promoter layer may be present between layers which do not directly adjoin one another. More particularly, an adhesion promoter layer may be present between the barrier layer and the inner polymer layer, and between the barrier layer and the carrier layer.

Useful adhesion promoters in an adhesion promoter layer include all polymers which are suitable for producing a firm bond through functionalization by means of suitable functional groups, through the forming of ionic bonds or covalent bonds with a surface of a respective adjacent layer. Preferably, these comprise functionalized polyolefins which have been obtained by copolymerization of ethylene with acrylic acids such as acrylic acid, methacrylic acid, crotonic acid, acrylates, acrylate derivatives or carboxylic anhydrides that bear double bonds, for example maleic anhydride, or at least two of these. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrel®0609HSA trade names by DuPont or Escor®6000ExCo by ExxonMobil Chemicals.

According to the invention, it is preferable that the adhesion between a carrier layer, a polymer layer or a barrier layer and the next layer in each case is at least 0.5 N/15 mm, preferably at least 0.7 N/15 mm and especially preferably at least 0.8 N/15 mm. In one configuration of the invention, it is preferable that the adhesion between a polymer layer and a carrier layer is at least 0.3 N/15 mm, preferably at least 0.5 N/15 mm and especially preferably at least 0.7 N/15 mm. It is further preferable that the adhesion between a barrier layer and a polymer layer is at least 0.8 N/15 mm, preferably at least 1.0 N/15 mm and especially preferably at least 1.4 N/15 mm. If a barrier layer indirectly follows a polymer layer with an adhesion promoter layer in between, it is preferable that the adhesion between the barrier layer and the adhesion promoter layer is at least 1.8 N/15 mm, preferably at least 2.2 N/15 mm and especially preferably at least 2.8 N/15 mm. In a particular configuration, the adhesion between the individual layers is sufficiently strong that a carrier layer is torn apart in an adhesion test, called a cardboard fibre tear in the case of a cardboard as carrier layer.

Polyolefin

A preferred polyolefin is a polyethylene or a polypropylene or both. A preferred polyethylene is one selected from the group consisting of an LDPE, an LLDPE, and an HDPE, or a combination of at least two thereof. A further preferred polyolefin is an mPolyolefin. Suitable polyethylenes have a melt flow rate (MFR) in a range from 1 to 25 g/10 min, preferably in a range from 2 to 20 g/10 min and especially preferably in a range from 2.5 to 15 g/10 min, and a density in a range from 0.910 g/cm$^3$ to 0.935 g/cm$^3$, preferably in a range from 0.912 g/cm$^3$ to 0.932 g/cm$^3$, and further preferably in a range from 0.915 g/cm$^3$ to 0.930 g/cm$^3$.

mPolymer

An mPolymer is a polymer which has been prepared by means of a metallocene catalyst. Metallocene is an organometallic compound in which a central metal atom is arranged between two organic ligands, for example cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two thereof.

Extrusion

In the extrusion, the polymers are typically heated to temperatures of 210 to 330° C., measured in the molten polymer film beneath the exit from the extruder die. The extrusion can be effected by means of extrusion tools which are known to those skilled in the art and are commercially available, for example extruders, extruder screws, feed blocks, etc. At the end of the extruder, there is preferably an opening through which the polymer melt is pressed. The opening may have any shape that allows extrusion of the polymer melt to the composite precursor. For example, the opening may be angular, oval or round. The opening is preferably in the form of a slot of a funnel. In a preferred configuration of the method, application is effected through a slot. The slot preferably has a length in a range from 0.1 to 100 m, preferably in a range from 0.5 to 50 m, especially preferably in a range from 1 to 10 m. In addition, the slot preferably has a width in a range from 0.1 to 20 mm, preferably in a range from 0.3 to 10 mm, especially preferably in a range from 0.5 to 5 mm. During the application of the polymer melt, it is preferable that the slot and the composite precursor move relative to one another. Preference is given to such a process wherein the composite precursor moves relative to the slot.

In a preferred extrusion coating method, the polymer melt is stretched during the application, this stretching preferably being effected by melt stretching, and most preferably by monoaxial melt stretching. For this purpose, the layer is applied to the composite precursor in the molten state by means of a melt extruder, and the layer applied, which is still in the molten state, is subsequently stretched in the preferably monoaxial direction, in order to achieve orientation of the polymer in this direction. Subsequently, the layer applied is left to cool for the purpose of heat-setting. In this context, it is especially preferable that the stretching is effected by at least the following application steps:

b1. emergence of the polymer melt as a melt film through at least one extruder die slot with a velocity of emergence $V_{out}$;

b2. application of the melt film to the composite precursor moving relative to the at least one extruder die slot with a velocity of movement rate $V_{for}$;

where $V_{out} < V_{for}$. It is especially preferable that $V_{for}$ is greater than $V_{out}$ by a factor in the range from 5 to 200, especially preferably in a range from 7 to 150, further preferably in a range from 10 to 50 and most preferably in a range from 15 to 35. It is preferable here that $V_{for}$ is at least 100 m/min, especially preferably at least 200 m/min and most preferably at least 350 m/min, but typically not more than 1300 m/min. Once the melt layer has been applied to the composite precursor by means of the above-described stretching process, the melt layer is left to cool down for the purpose of heat-setting, this cooling preferably being effected by quenching via contact with a surface which is kept at a temperature in a range from 5 to 50° C., especially preferably in a range from 10 to 30° C.

In a further preferred configuration, the area which has emerged is cooled down to a temperature below the lowest melting temperature of the polymers provided in this area or its flanks, and then at least the flanks of the area are separated from this area. The cooling can be effected in any manner which is familiar to the person skilled in the art and seems to be suitable. Preference is given here too to the heat-setting which has already been described above. Subsequently, at least the flanks are separated from the area. The separation can be conducted in any manner which is familiar to the person skilled in the art and seems to be suitable. Preferably, the separation is effected by means of a knife, laser beam or waterjet, or a combination of two or more thereof, the use of knives being especially preferable, especially knives for shearing.

Production of a Fold

A fold is produced along a crease if an angle formed by the fold regions of the sheet-like composite that are adjacent along the crease differs by at least 10° from 180° for the first time as a result of folding. In the course of production of the fold by folding for the first time by at least 10° along the crease as described above, more particularly, the carrier layer is weakened along the fold.

Test Methods

The test methods which follow were utilized in the context of the invention. Unless stated otherwise, the measurements were conducted at an ambient temperature of 23° C., an ambient air pressure of 100 kPa (0.986 atm) and a relative air humidity of 50%.

MFR

MFR is measured in accordance with standard ISO 1133 (unless stated otherwise at 190° C. and 2.16 kg).

Density

Density is measured in accordance with standard ISO 1183-1.

Melting Temperature

Melting temperature is determined using the DSC method ISO 11357-1, -5. The instrument is calibrated according to the manufacturer's instructions using the following measurements:

temperature indium—onset temperature,
heat of fusion indium,
temperature zinc—onset temperature.

Oxygen Permeation Rate

Oxygen permeation rate is determined in accordance with standard ISO 14663-2 Annex C at 20° C. and 65% relative air humidity.

Moisture Content of Cardboard

Moisture content of cardboard is measured in accordance with standard ISO 287:2009.

Adhesion

The adhesion of two adjacent layers is determined by fixing them in a 90° peel test instrument, for example the Instron "German rotating wheel fixture", on a rotatable roller which rotates at 40 mm/min during the measurement. The samples were previously cut into strips of width 15 mm. On one side of the sample, the laminas are detached from one another and the detached end is clamped in a tensile device directed vertically upward. A measuring instrument to determine the tensile force is attached to the tensile device. As the roller rotates, the force needed to separate the laminas from one another is measured. This force corresponds to the adhesion of the layers to one another and is reported in N/15 mm. The separation of the individual layers can be effected mechanically, for example, or by means of a controlled pretreatment, for example by soaking the sample in 30% acetic acid at 60° C. for 3 min.

Detection of Colourants

Detection of organic colourants can be conducted in accordance with the methods described in "Industrial Organic Pigments, Third Edition" (Willy Herbst, Klaus Hunger Copyright® 2004 WILEY-VCH Verlag GmbH & Co. KGaA, Weinheim ISBN: 3-527-30576-9).

Shaping Coefficient

The shaping coefficient is defined as follows:

Shaping coefficient=shaping force/(zero sample force·grammage).

This can be represented as:

$$K = \frac{F_{shaping}}{F_{zero\ sample} \cdot GR} = \left[\frac{N}{mN \cdot \frac{g}{m^2}}\right] \triangleq 1000000 \left[\frac{m^2}{kg}\right]$$

where K is the shaping coefficient, $F_{shaping}$ is the shaping force, $F_{zero\ sample}$ is the zero sample force and GR is the grammage. Thus, the unit of the shaping coefficient is $m^2/kg$. The individual parameters of the shaping coefficient are determined as specified below.

Zero Sample Force

To measure the zero sample force, three specimens are taken from the uncreased container precursor according to the German version of DIN EN ISO 186:2002, the sample size being 60 mm×25 mm. These specimens are then analysed by means of an SRT-Win 1.5 crease-bend tester from Karl Marbach GmbH & Co. KG, Heilbronn, Germany, according to the operating instructions dated March 2010. This is done by clamping the specimens in a holding clamp developed in-house and placing them onto the turntable. The configuration of the clamp is shown in FIGS. 8 a) and b), 9 a) and b) and 10 a) and b). The evaluation is effected according to DIN 55437-3:2008-05 and DIN 53121:2014-08, the maximum force value over the bending angle range being determined here at bending of up to 150°.

Shaping Force

To measure the shaping force, the container precursor is clamped in unchanged form as obtained by the method according to the invention in the flat-folded state between two compression plates of a strength testing machine (TIRA test 28025 universal strength testing machine) from TIRA GmbH, Schalkau, Germany and, as in the "Compression test" method according to DIN EN ISO 12048:2000, in the case of the compression test, a load is applied until a fixed displacement (to be selected according to the container precursor format, typically 30 mm) has taken place. The curve profile is recorded and evaluated with the TIRA test software.

The universal strength testing machine is a motor-driven compression plate system capable of applying a load which results from uniform movement of one of the plates at a relative speed of 10 mm/min±3 mm/min.

Grammage

The grammage is determined by taking a laminate sample of defined size from the container precursor and weighing the sample.

The invention is described in more detail hereinafter by examples and drawings, although the examples and drawings do not imply any restriction of the invention. Moreover, the drawings, unless stated otherwise, are not to scale.

For the examples (inventive) and comparative examples (non-inventive), laminates were produced with the following layer sequence by a layer extrusion method with a standard extrusion coating system.

TABLE 1

Layer structure of the laminate used for the examples and comparative examples

| Layer designation | Material | Grammage [g/m²] |
|---|---|---|
| Decorative layer | MAS ink series, SunChemical, Parssippany, USA | / |
| Outer polymer layer | LDPE 23L430 from Ineos GmbH, Cologne | 15 |
| Carrier layer | Cardboard: Stora Enso Natura T Duplex double coated, Scott bond 200 J/m² | 191 |
| Lamination layer | LDPE 23L430 from Ineos GmbH, Cologne | 20 |
| Barrier layer | Aluminium, EN AW 8079 from Hydro Aluminium Deutschland GmbH | here: thickness 6 μm |
| Inner polymer layer | LDPE 19N430 from Ineos GmbH, Cologne | 40 |

The laminate obtained by the layer extrusion process is used to manufacture container precursors in the form of sleeves for the examples and comparative examples. In each case, longitudinal creases 1 to 4 are introduced, as is the corresponding first to fourth longitudinal fold. Moreover, a longitudinal seam is produced by means of heat sealing.

The internal and external angles of the longitudinal folds are produced in the laboratory with a folding flap (Lexikon Verpackungstechnik [Lexicon of Packaging Technology], ISBN3954681668, 9783954681662, page 155). The heat sealing is effected by means of an HSG250 heat-sealing unit from Kopp Verpackungstechnik, Esslingen, Germany. The initial pressure is set to 4.5 bar and the sealing temperature to 135° C.

In addition, a multitude of container precursors are introduced into an outer packaging for transport. The outer packaging for transport has the following dimensions: length 600 mm; width 110 mm; height 152 mm. According to Table 2, the container precursors in the examples and comparative examples, prior to the packaging of a multitude of the respective container precursors in an outer carton, can be folded over once or twice, or the folding over may follow the removal from the outer packaging in the filling machine. The advantages and disadvantages detailed in Table 3 arise.

TABLE 2

Characterization of container precursor manufacturing methods according to examples and comparative examples

| Example | Production of longitudinal folds prior to longitudinal seam formation | | | | First folding over | Second folding over |
|---|---|---|---|---|---|---|
| | 1 | 2 | 3 | 4 | | |
| Comparative Example 1 | yes | no | yes | no | no | no |
| Comparative Example 2 | yes | yes | yes | yes | no | no |
| Comparative Example 3 | yes | yes | yes | yes | yes, in the filling machine | no |
| Example 1 | yes | yes | yes | yes | yes, before the outer packaging | no |
| Example 2 | yes | yes | yes | yes | yes, before the outer packaging | yes, before the outer packaging |

TABLE 3

Characterization of the container precursors according to the examples and comparative examples

| Example | Shaping coefficient of the container precursor [m²/kg] | Shaping defects in filling machine [per 1000] | Damage to the decorative side | Number of sleeves in one outer package |
|---|---|---|---|---|
| Comparative Example 1 | 3 | 1000 | – | 300 |
| Comparative Example 2 | 8 | 1000 | – | 150 |
| Comparative Example 3 | 24 | 2 | – | 150 |
| Example 1 | 24 | 2 | + | 280 |
| Example 2 | 11.7 | 0 | + | 293 |

Damage to the decorative layer is characterized in Table 2 according to the following scale:

| | |
|---|---|
| + | no damage to the decorative layer (not apparent either to the naked eye or with a magnifying glass with 6-fold magnification) |
| 0 | slight damage to the decorative side (apparent with a magnifying glass with 6-fold magnification) |
| – | damage to the decorative size visible to the eye |

The results in Table 3 have been established using a CFA 712 standard filling machine from SIG Combibloc, Linnich, Germany. For this purpose, for each example and comparative example, 1000 container precursors were processed in the filling machine. The shaping coefficient for each example and comparative example was measured by the method described above, in each case before the outer packing of the container precursors.

Unless stated otherwise in each case in the description or the respective figure, the figures are schematic and not true to scale, and show the following:

DETAILED DESCRIPTION

Figure 1:
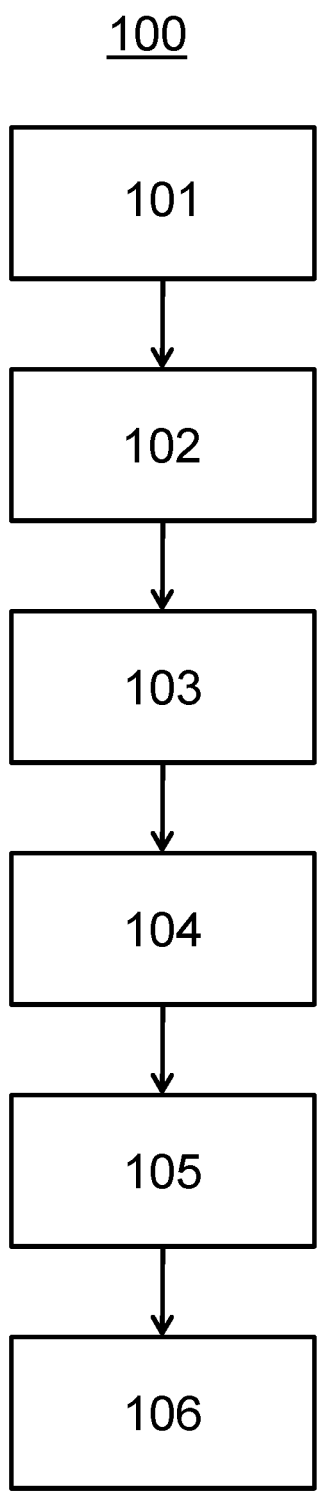
FIG. 1 a flow diagram of a process according to the invention.
Figure 16:
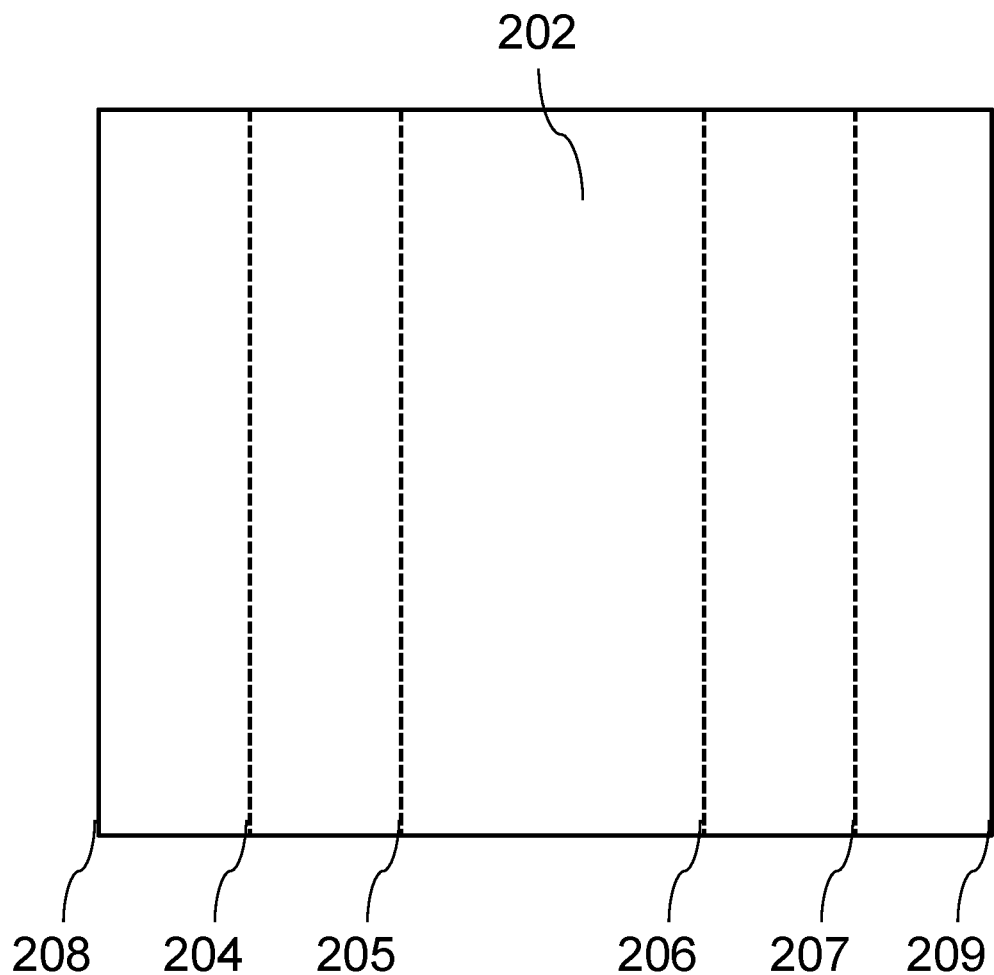
FIG. 16 the sheet-like composite from method step a) of the method according to FIG. 1.

FIG. 1 shows a flow diagram of a method 100 according to the invention. In a method step a) 101 of the method 100, a sheet-like composite 201 is provided. The latter comprises, as mutually superposed layers, from an inner face 202 of the sheet-like composite 201 to an outer face 203 of the sheet-like composite 201, a layer structure shown in FIG. 6. In addition, the sheet-like composite 201, as shown in FIG. 16, comprises a first longitudinal edge 208 and, opposite that, a further longitudinal edge 209, and also, in the direction from the first longitudinal edge 208 to the further longitudinal edge 209: a first longitudinal crease 204, a second longitudinal crease 205, a third longitudinal crease 206 and a fourth longitudinal crease 207. In a method step b) 102, by folding along the first longitudinal crease 204, a first longitudinal fold is produced and, by folding along the third longitudinal crease 206, a third longitudinal fold is produced. In this context, the first longitudinal fold is characterized by a first angle 801 and the third longitudinal fold by a third angle 803. In a method step c) 103, by folding along the fourth longitudinal crease 207, a fourth longitudinal fold is produced and, by folding along the second longitudinal crease 205, a second longitudinal fold is produced. In this context, the fourth longitudinal fold is characterized by a fourth angle 804 and the second longitudinal fold by a second angle 802. In this context, the first to fourth angles 801-804 are each on the inner face 202 of the sheet-like composite 201. In a method step d) 104, the first longitudinal edge 208 and the further longitudinal edge 209 are pressed against one another and sealed to one another. Thus, a longitudinal seam 210 is produced, which results in formation of a sleeve-like container precursor 800 for a single container from the folded sheet-like composite 201. The container precursor 800 is obtained in a first flat-folded state. In a method step e) 105, the container precursor 800 is folded in such a way that the first angle 801 and the third angle 803 are each reduced to 1° and the second angle 802 and the fourth angle 804 are each increased to 179°. Thus, the container precursor 800 is converted from the first flat-folded state to a further flat-folded state, i.e. folded over. According to method steps a) 101 to e) 105, a multitude of container precursors 800 are produced, which constitutes method step A. overall. In a method step B. 106, 150 container precursors 800 obtained according to method steps a) 101 to e) 105 are packaged in an outer box as a stack.

Figure 2:
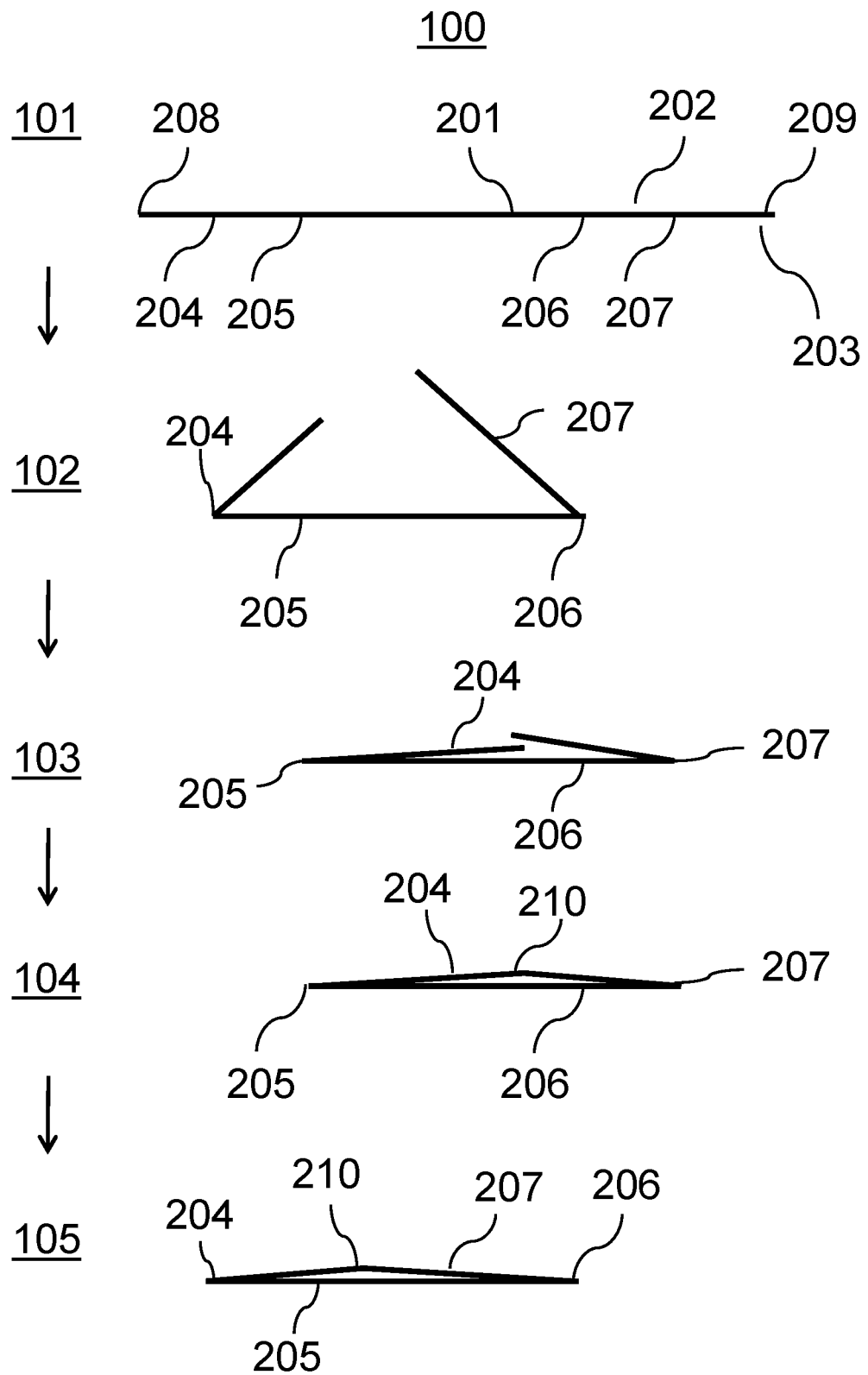
FIG. 2 schematic snapshots of the sheet-like composite in method steps a) to e) of the method according to the invention according to FIG. 1.

FIG. 2 shows schematic snapshots of the sheet-like composite 201 in method steps a) 101 to e) 105 of the method according to the invention 100 according to FIG. 1. As shown, the sheet-like composite 201 provided in method step a) 101 is unfolded, but creased. The sheet-like composite 201 comprises, in the direction from the first longitudinal edge 208 to the further longitudinal edge 209: the first longitudinal crease 204, the second longitudinal crease 205, the third longitudinal crease 206 and the fourth longitudinal crease 207. The sheet-like composite 201 provided is a blank for manufacture of a single closed foodstuff container. In addition, FIG. 2 shows a snapshot in method step b) 102. Here, the first longitudinal fold along the first longitudinal crease 204 and the third longitudinal fold along the third longitudinal crease 206 have already been produced. The first angle 801 is reduced to 50° and the third angle 803 to 52°. Subsequently, the first angle 801 and the third angle 803 are each increased to 180° (not shown). A snapshot of method step c) 103 shows the already produced second longitudinal fold along the second longitudinal crease 205 and the fourth longitudinal fold along the fourth longitudinal crease 207. The second angle 802 has been reduced to 3° and the fourth angle 804 to 5°. In a snapshot of method step d) 104, the first longitudinal edge 208 and the further longitudinal edge 209 have been contacted with one another and joined by sealing. Thus, the longitudinal seam 210 has been produced. A further snapshot shows the result of method step e) 105. The container precursor 800 was folded over as described for FIG. 1, such that the first angle 801 of the first longitudinal fold along the first longitudinal crease 204 and the third angle 803 of the third longitudinal fold along the third longitudinal crease 206 were each reduced to 10, and the second angle 802 of the second longitudinal fold along the second longitudinal crease 205 and the fourth angle 804 of the fourth longitudinal fold along the fourth longitudinal crease 207 were each increased to 179°.

Figure 3:
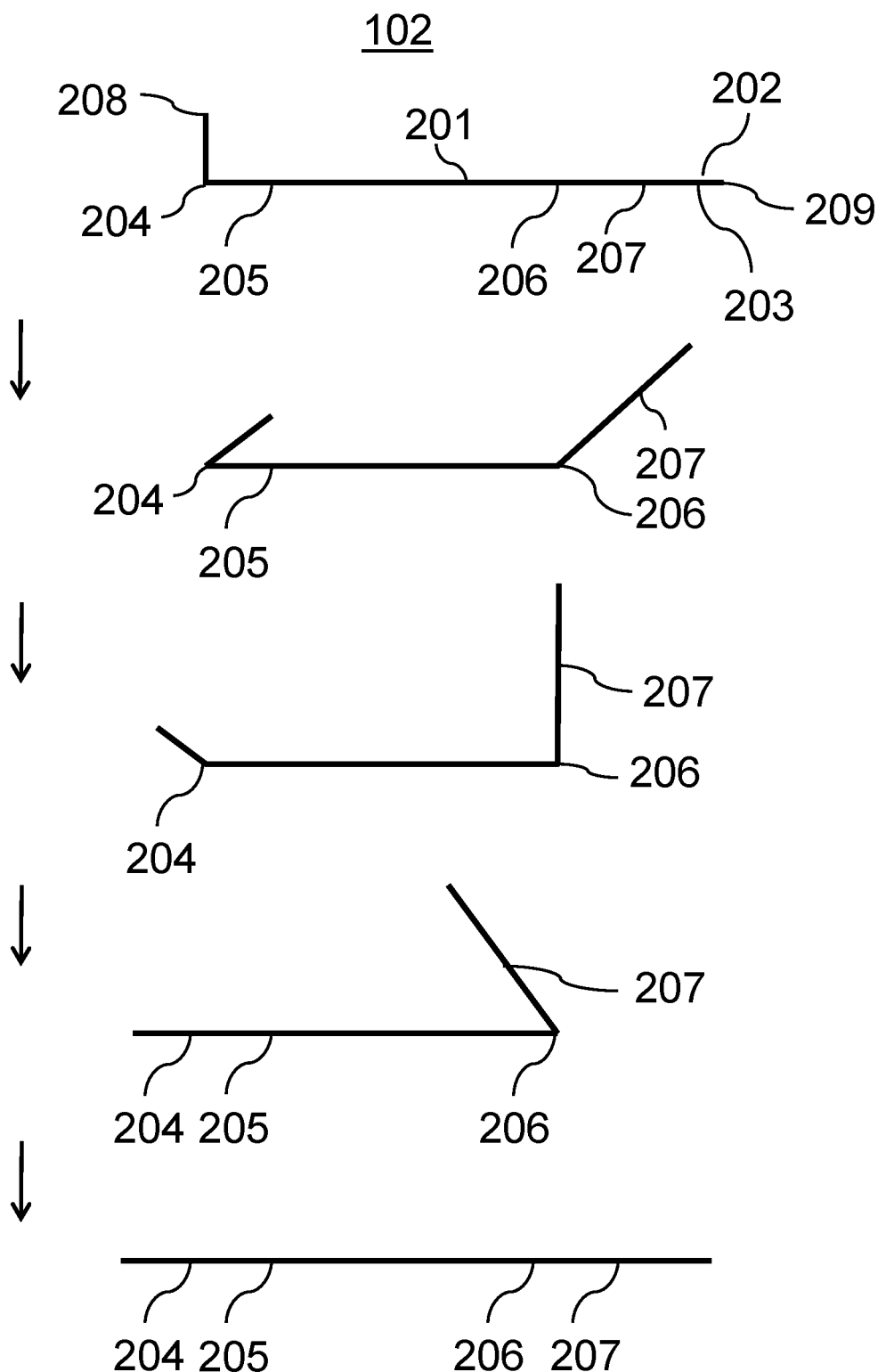
FIG. 3 schematic snapshots of a sheet-like composite in method step b) of a further method according to the invention.

FIG. 3 shows schematic snapshots of a sheet-like composite 201 in method step b) 102 of a further method according to the invention 100. In addition, the method 100 according to FIG. 3 comprises method steps a) 101 and c) 103 to e) 105 according to FIGS. 1 and 2. In method step b) 102 according to FIG. 3, the first angle 801 is first reduced to 90° and hence the first longitudinal fold along the first longitudinal crease 204 is produced. In addition, in method step b) 102, the first angle 801 is reduced further to 50° and, at the same time, the third angle 803 is reduced to 135° and hence the third longitudinal fold along the third longitudinal crease 206 is produced. In addition, in method step b) 102, the first angle 801 is increased to 135° and, at the same time, the third angle 803 is reduced further to 90°. In addition, in method step b) 104, the first angle 801 is increased further to 180° and the third angle 803 is reduced to 50°. In addition, the third angle 803 is folded to 180°. Thus, the sheet-like composite 201 has been returned to a flat state. Method steps c) 103, d) 104 and e) 105 follow according to FIGS. 1 and 2.

Figure 4:
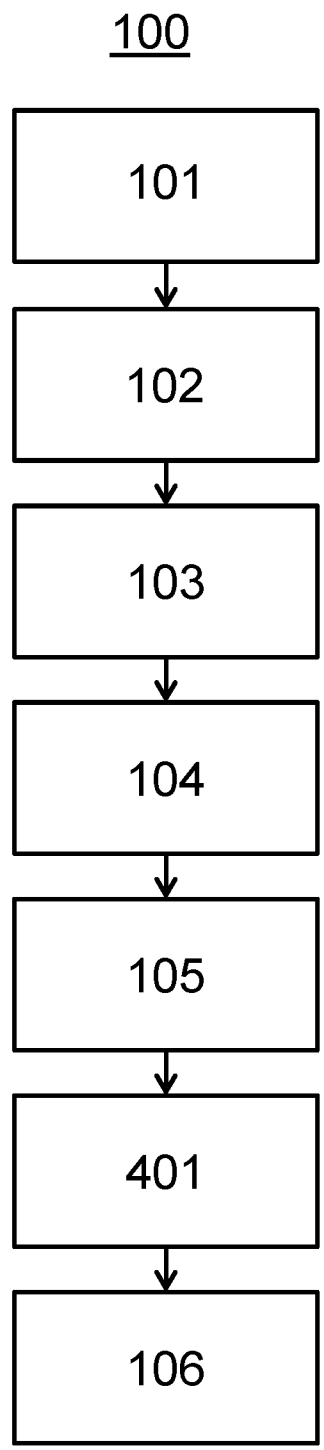
FIG. 4 a flow diagram of a further method according to the invention.

FIG. 4 shows a flow diagram of a further method 100 of the invention. In a method step a) 101 of the method 100 according to FIG. 4, a sheet-like composite 201 is provided. The latter comprises, as superposed layers, from an inner face 202 of the sheet-like composite 201 to an outer face 203 of the sheet-like composite 201, a layer structure shown in FIG. 6. In addition, the sheet-like composite 201 comprises, as shown in FIG. 16, a first longitudinal edge 208 and, opposite that, a further longitudinal edge 209 and, in the direction from the first longitudinal edge 208 to the further longitudinal edge 209: a first longitudinal crease 204, a second longitudinal crease 205, a third longitudinal crease 206 and a fourth longitudinal crease 207. In a method step b) 102, a first longitudinal fold is produced by folding along the first longitudinal crease 204, and a third longitudinal fold is produced by folding along the third longitudinal crease 206. In this case, the first longitudinal fold is characterized by a first angle 801 and the third longitudinal fold by a third angle 803. In a method step c) 103, a fourth longitudinal fold is produced by folding along the fourth longitudinal crease 207, and a second longitudinal fold is produced by folding along the second longitudinal crease 205. In this case, the fourth longitudinal fold is characterized by a fourth angle 804 and the second longitudinal fold by a second angle 802. In this case, the first to fourth angles 801-804 are each on the inner face 202 of the sheet-like composite 201. In a method step d) 104, the first longitudinal edge 208 and the further longitudinal edge 209 are pressed onto one another and sealed to one another. Thus, a longitudinal seam 210 is produced, which gives rise to a sleeve-like container precursor 800 for a single container from the folded sheet-like composite 201. The container precursor 800 is obtained in a first flat-folded state. In a method step e) 105, the container precursor 800 is folded in such a way that the first angle 801 and the third angle 803 are each reduced to 0°, and the second angle 802 and the fourth angle 804 are each increased to 180°. Thus, the container precursor 800 is converted from the first flat-folded state to a further flat-folded state, i.e. folded over. Method step e) 105 is followed by a method step f) 401. In method step f) 401, the first angle 801 and the third angle 803 are each increased to 180°, and the second angle 802 and the fourth angle 804 are each reduced to 0°. Thus, the container precursor 800 is converted from the further flat-folded state to the first flat-folded state, i.e. folded over once more. In method steps a) 101 to f) 401, a multitude of container precursors 800 are produced, which constitutes method step A. overall. In a method step B. 106, 200 container precursors 800 obtained according to method steps a) 101 to g) 401 are packaged in an outer box as a stack.

Figure 5:
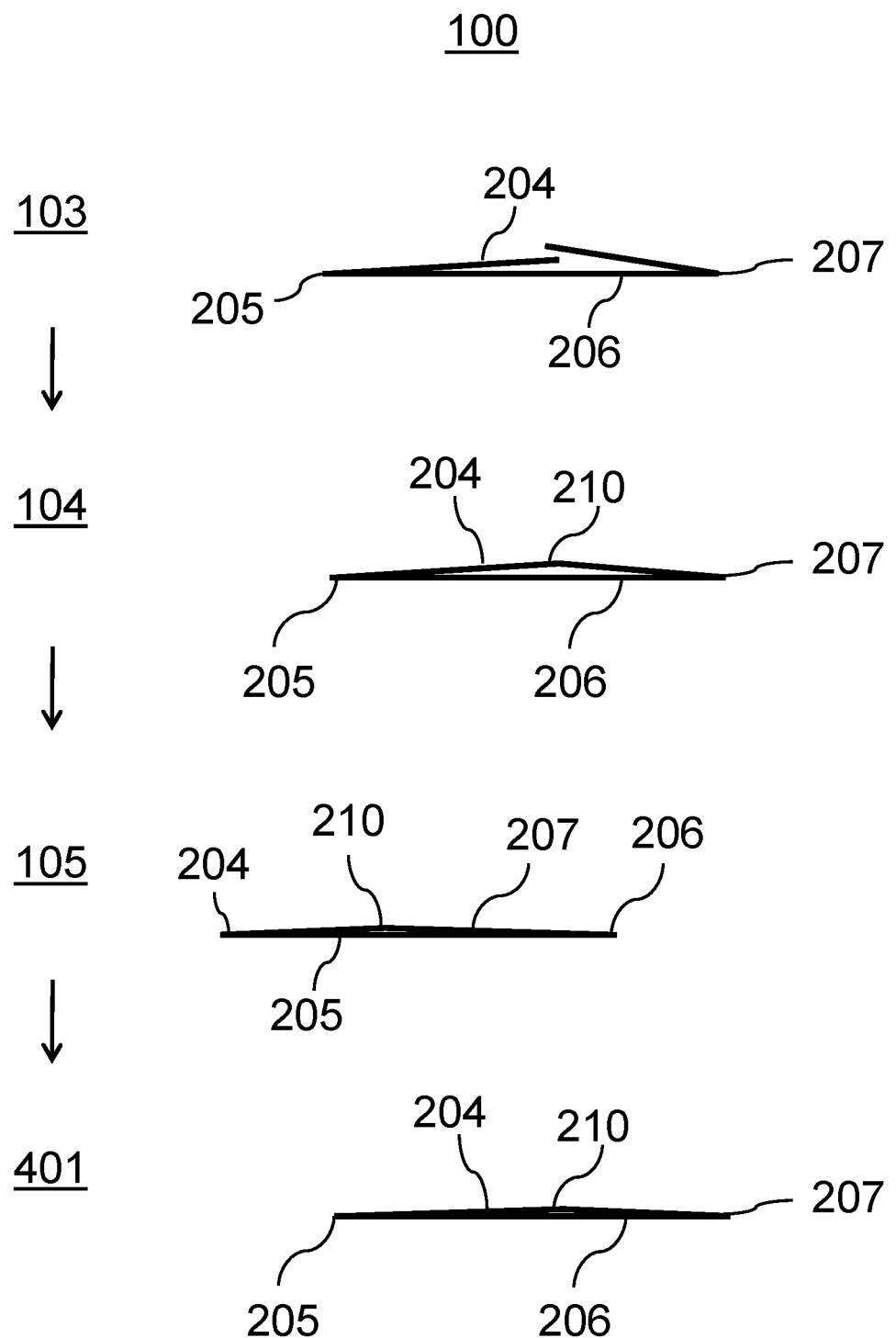
FIG. 5 schematic snapshots of the sheet-like composite in method steps c) to g) of the method according to the invention according to FIG. 4.

FIG. 5 shows schematic snapshots of the sheet-like composite 201 in method steps c) 103 to g) 401 of the method 100 according to the invention as per FIG. 4.

Figure 6:
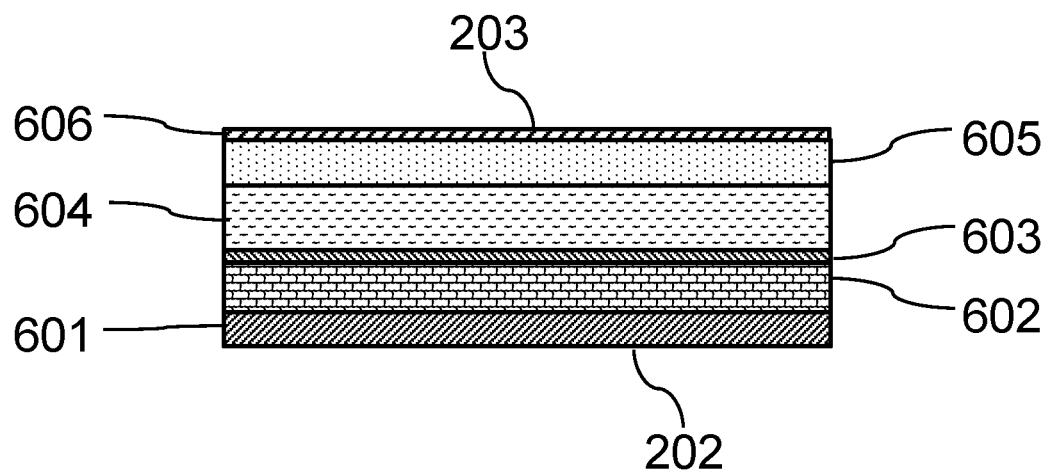
FIG. 6 a detail of the sheet-like composite of the method according to FIG. 1 in cross section.

The sheet-like composite 201 provided in method step a) 101 is unfolded, but creased (not shown). The sheet-like composite 201 comprises, in the direction from the first longitudinal edge 208 to the further longitudinal edge 209: the first longitudinal crease 204, the second longitudinal crease 205, the third longitudinal crease 206 and the fourth longitudinal crease 207. The sheet-like composite 201 provided is a blank for production of a single closed foodstuff container. In method step b) 102, as described above, the first longitudinal fold is produced along the third longitudinal crease 204, and the third longitudinal fold along the third longitudinal crease 206 (not shown). For this purpose, the first angle 801 is reduced to 55°, and the third angle 803 to 57°. Subsequently, the first angle 801 and the third angle 803 are each increased to 180° (not shown). FIG. 5 shows a snapshot of method step c) 103. This shows the already produced second longitudinal fold along the second longitudinal crease 205 and the fourth longitudinal fold along the fourth longitudinal crease 207. The second angle 802 has been reduced to 3° and the fourth angle 804 has been reduced to 5°. In a snapshot of method step d) 104, the first longitudinal edge 208 and the further longitudinal edge 209 have been contacted with one another and joined by sealing. Thus, the longitudinal seam 210 has been produced. The container precursor 800 obtained is in the first flat-folded state. A further snapshot shows the result of method step e) 105. The container precursor 800 was folded over as described for FIG. 4, such that the first angle 801 of the first longitudinal fold along the first longitudinal crease 204 and the third angle 803 of the third longitudinal fold along the third longitudinal crease 206 were each reduced to 0°, and the second angle 802 of the second longitudinal fold along the second longitudinal crease 205 and the fourth angle 804 of the fourth longitudinal fold along the fourth longitudinal crease 207 were each increased to 180°. Here, the container precursor 800 is in the further flat-folded state. In addition, FIG. 5 shows, in a further snapshot, the result of method step f) 401. The first angle 801 and the third angle 803 have each been increased to 180°, and the second angle 802 and the fourth angle 804 have each been reduced to 0°. The container precursor 800 is again in the first flat-folded state. FIG. 6 shows a detail of a layer sequence of the sheet-like composite 201 of the method 100 according to FIG. 1 in cross section. From the inner face 202 of the sheet-like composite 201 to the outer face 203 of the sheet-like composite 201, the layer sequence comprises an inner polymer layer 601, a barrier layer 602, an adhesion promoter layer 603, a carrier layer 604, an outer polymer layer 605 and, printed thereon, an colour layer 606 which comprises a colourant and constitutes a decoration 606.

Figure 7:
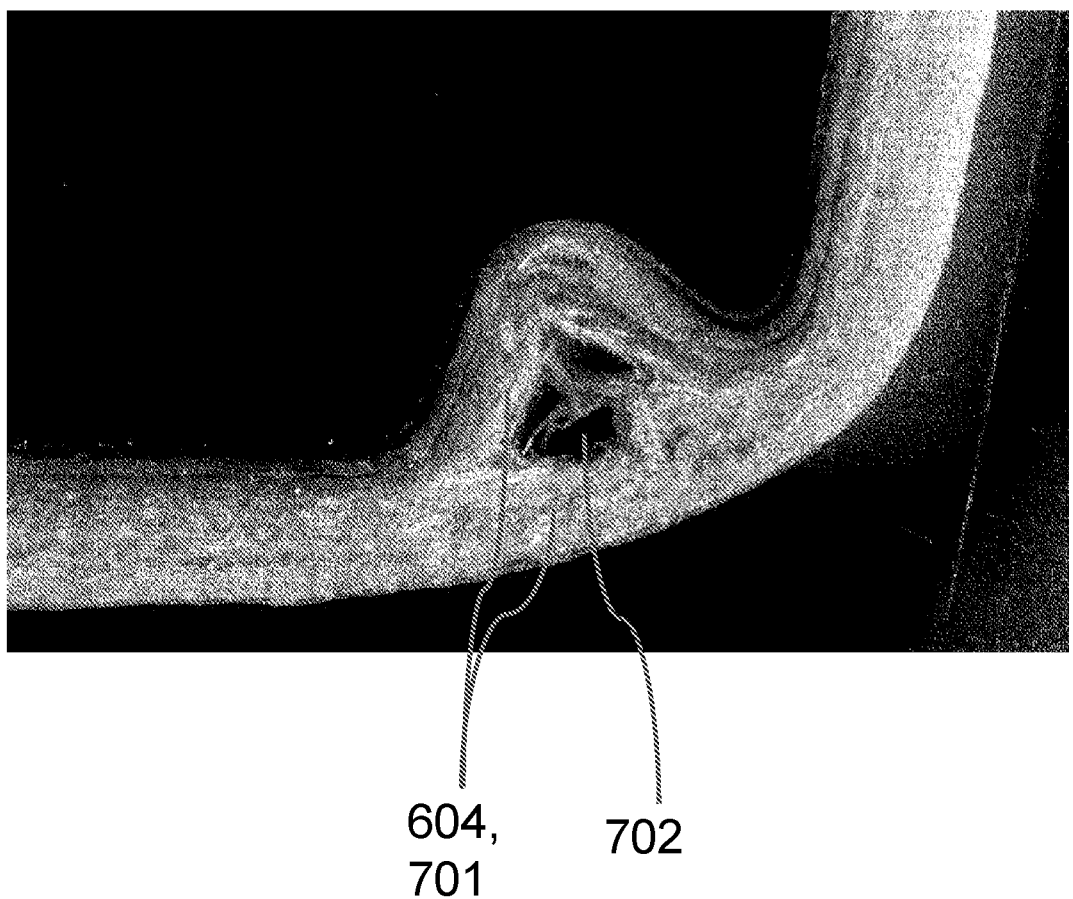
FIG. 7 a microscope image of a longitudinal crease of a sheet-like composite of a container precursor according to the invention in cross section.
Figure 8:
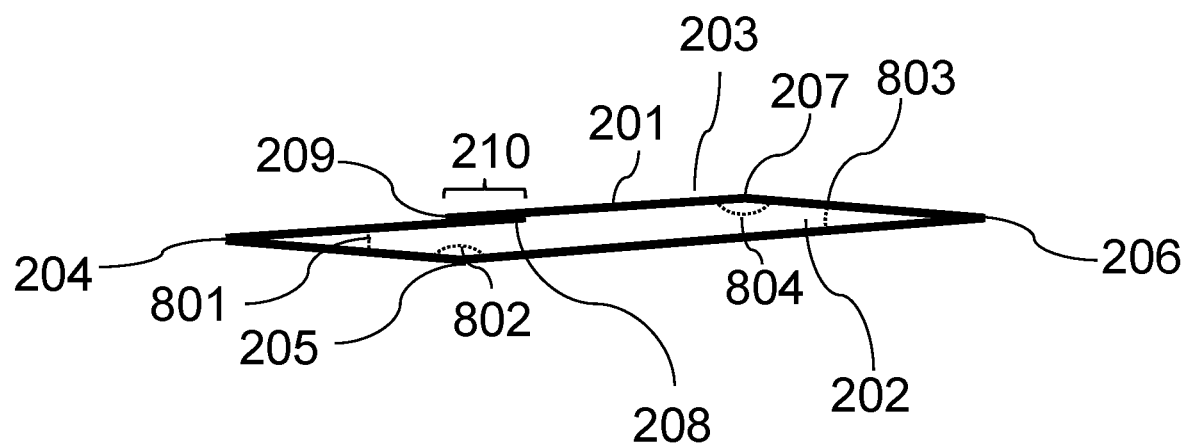
FIG. 8 a container precursor according to the invention in top view (upright)

FIG. 7 shows a microscope image of a longitudinal crease 204-207 of a sheet-like composite 201 of the inventive container precursor 800 in FIG. 8 in cross section. It is clearly apparent that the carrier layer 604 is split into 2 separate sublayers 701 along the longitudinal crease 204-207. Between the two sublayers 701, the carrier layer 604 forms a cavity 702.

Figure 12:
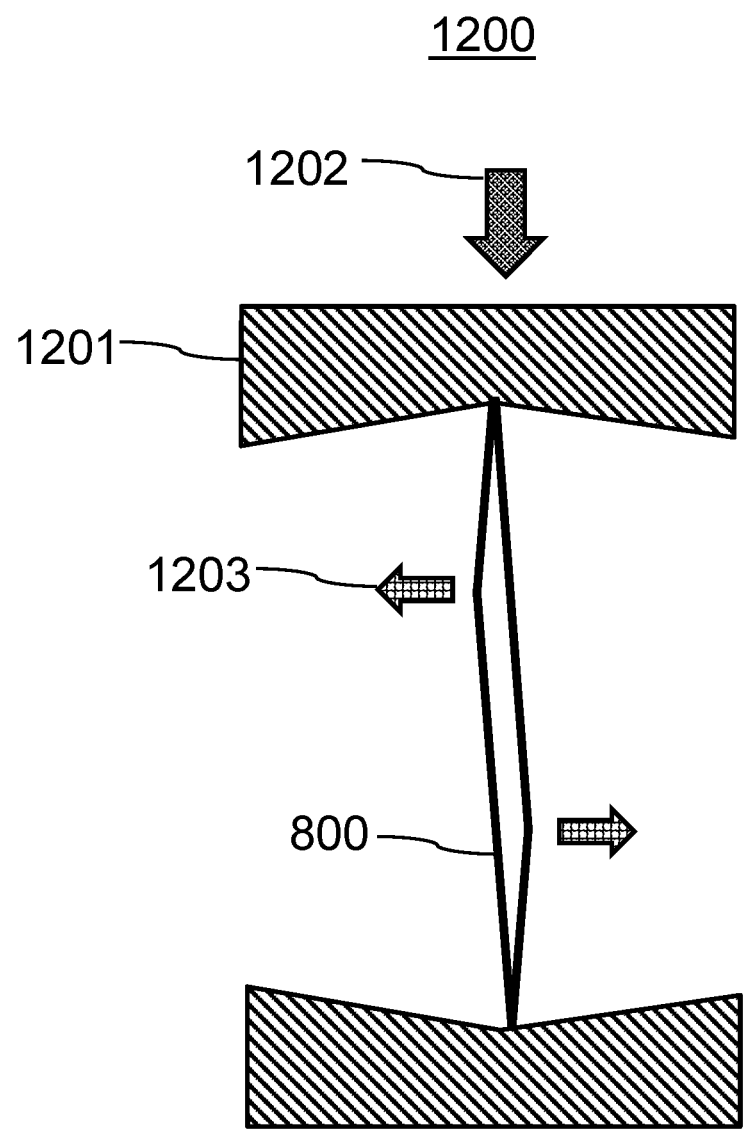
FIG. 12 a test setup for measuring the shaping force.

FIG. 8 shows an inventive container precursor 800 in top view (upright). The container precursor 800 consists of a sheet-like composite 201, the layer structure of which is shown in cross section in FIG. 6. In this case, the sheet-like composite 201 is a blank for manufacture of a single container. The container precursor 800 comprises a first longitudinal edge 208 and, opposite that across the sheet-like composite 201, a further longitudinal edge 209. The first longitudinal edge 208 is sealed to the further longitudinal edge 209. This results in formation of a longitudinal seam 210 of the container precursor 800. The longitudinal seam 210 in this container precursor 800 runs through about the middle of a wall area of the container precursor 800. In the case of other inventive container precursors 800, the longitudinal seam 210 may instead run along a longitudinal fold, i.e. along a longitudinal edge 1101 of the container precursor 1000. Across the sheet-like composite 201, from the first longitudinal edge 208 to the further longitudinal edge 209, the sheet-like composite 201 comprises a first longitudinal crease 204, a second longitudinal crease 205, a third longitudinal crease 206 and a fourth longitudinal crease 207. Therein, a first longitudinal fold runs along the first longitudinal crease 204, a second longitudinal fold along the second longitudinal crease 205, a third longitudinal fold along the third longitudinal crease 206, and a fourth longitudinal fold along the fourth longitudinal crease 207. The longitudinal folds are each intended to form a longitudinal edge 901 in the closed container to be produced. The first longitudinal fold is characterized by a first angle 801, the second longitudinal fold by a second angle 802, the third longitudinal fold by a third angle 803, and the fourth longitudinal fold by a fourth longitudinal angle 804. Therein, the first angle 801 and the third angle 803 are each 3°, and the second angle 802 and the fourth angle 804 are each 177°. Thus, the container precursor 800, in accordance with the invention, is in a flat-folded state. By shaping 1203 of the flat-folded container precursor 800, it can be formed to give a sleeve structure. The shaping 1203 can be effected by simultaneous folding of the first to fourth longitudinal folds as indicated in FIG. 12. The container precursor 800 is obtainable by method steps a) 101 to e) 105 of the method 100 according to FIG. 1.

Figure 9:
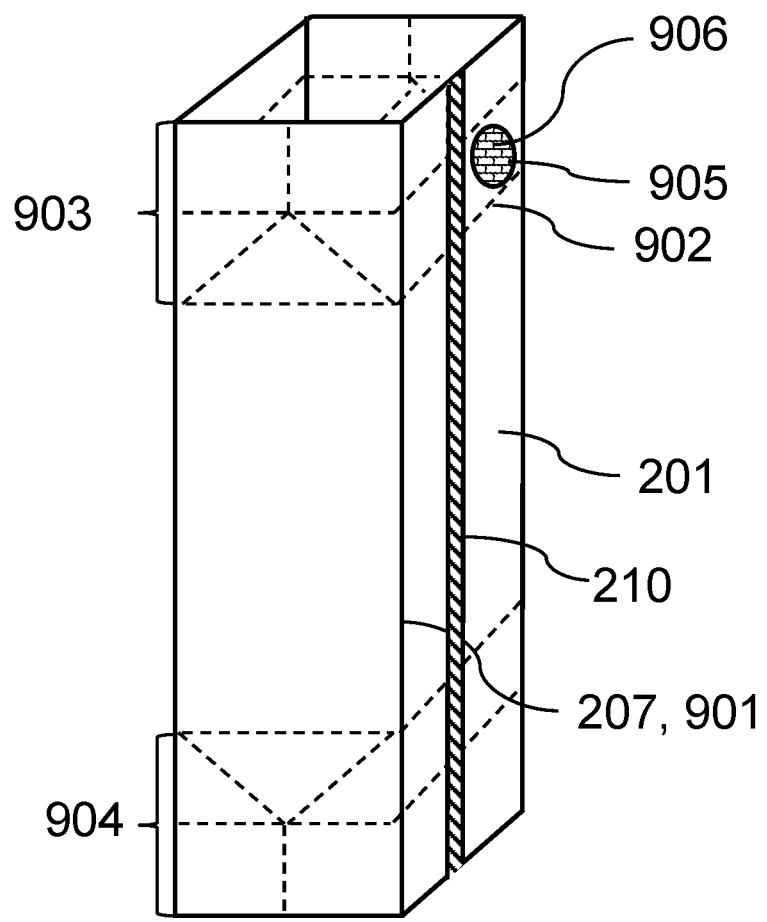
FIG. 9 the container precursor according to FIG. 8 in side view (upright) after shaping.

FIG. 9 shows the container precursor 800 according to FIG. 8 in side view (upright) after the shaping 1203. Thus, the container precursor 800 in FIG. 9 is no longer in a flat-folded state. In the side view shown in FIG. 9, compared to FIG. 8, moreover, a hole 905 can be seen in a carrier layer 604 of the sheet-like composite 201. The hole 905 is covered by an adhesion promoter layer 603, a barrier layer 602 and an inner polymer layer 601 as hole-covering layers 906 on the inner face 202 of the sheet-like composite 201. In addition, further creases 902 are shown. By folding along the further creases 902 and joining appropriate parts of the sheet-like composite 201, it is possible to form a top region 903 and a base region 904 of a closed container. Also shown here is a longitudinal edge 901 formed from the fourth longitudinal fold along the fourth longitudinal crease 207.

Figure 10:
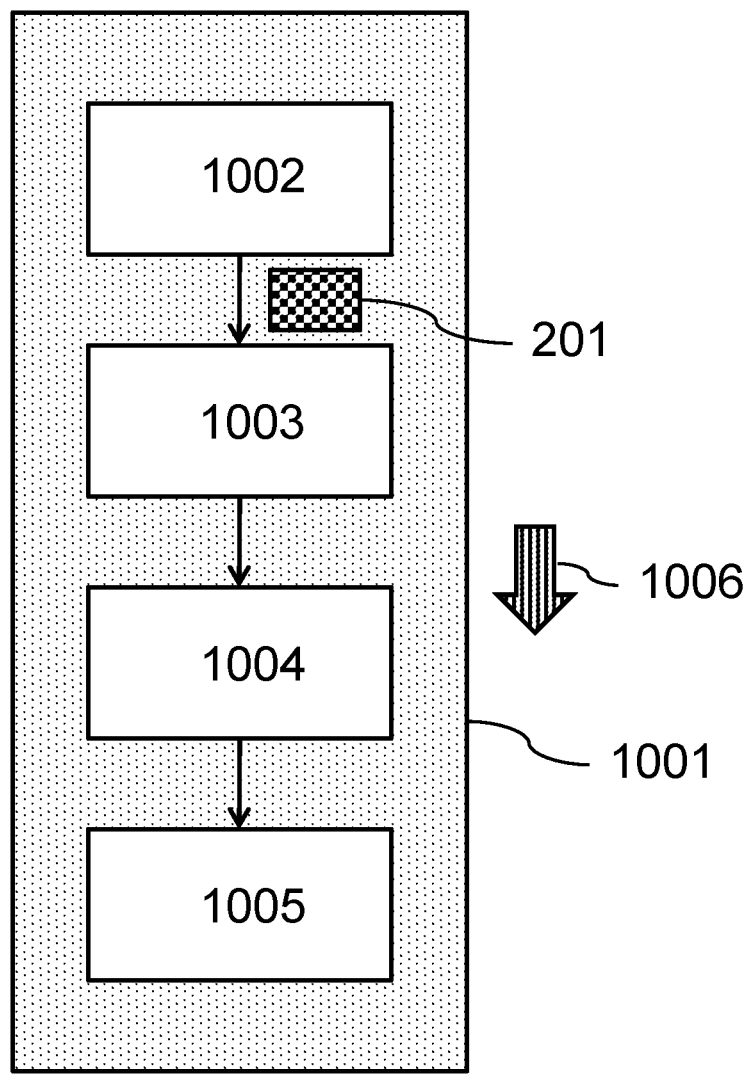
FIG. 10 an apparatus according to the invention.

FIG. 10 shows an inventive apparatus 1000. The apparatus 1000 comprises a sheet-like composite 201 which, from an inner face 202 to an outer face 203, comprises the layer sequence according to FIG. 6. In addition, the sheet-like composite 201, as shown in FIG. 16, comprises a first longitudinal edge 208 and a further longitudinal edge 209. As also shown in FIG. 16, the sheet-like composite 201 comprises, from the first longitudinal edge 208 to the further longitudinal edge 209: a first longitudinal crease 204, a second longitudinal crease 205, a third longitudinal crease 206, and a fourth longitudinal crease 207. Moreover, the apparatus 1000 comprises a transport unit 1001, designed to transport the sheet-like composite 201 from a first folding station 1002 to a first flat folding station 1005, in a transport direction 1006. The first folding station 1002 is designed to produce a first longitudinal fold along the first longitudinal crease 204 by reducing a first angle 801 which characterizes the first longitudinal fold to 55° and to produce a third longitudinal fold along the third longitudinal crease 206 by reducing a third angle 803 which characterizes the third longitudinal fold to 55°. For the aforementioned purpose, the first folding station 1002 comprises two continuously revolving belts, wherein the belts, for the above-described folding of the sheet-like composite 201, each rotate about their longitudinal axis along the transport direction 1006. In addition, the apparatus 1000 comprises a second folding station 1003 beyond the first folding station 1002 in transport direction 1006. The second folding station 1003 is designed to produce a second longitudinal fold along the second longitudinal crease 205 by reducing a second angle 802 that characterizes the second longitudinal fold to 2°, and to produce a fourth longitudinal fold along the fourth longitudinal crease 207 by reducing a fourth angle 804 that characterizes the fourth longitudinal fold to 2°. For the aforementioned purpose, the second folding station 1003 comprises two continuously revolving belts, wherein the belts, for the above-described folding of the sheet-like composite 201, each rotate about their longitudinal axis along the transport direction 1006. In addition, the apparatus 1000 comprises a longitudinal seam-forming station 1004, which is a sealing station. The latter is designed to contact and join the first longitudinal edge 208 to the further longitudinal edge 209 by ultrasound sealing thereby obtaining a longitudinal seam 210. For this purpose, the longitudinal seam-forming station 1004 comprises a sonotrode. The longitudinal seam-forming station 1004 is arranged beyond the second folding station 1003 in the transport direction 1006. It should also be mentioned that the first angle 801, the second angle 802, the third angle 803 and the fourth angle 804 are each on the inner face 202 of the sheet-like composite 201. In transport direction 1006, arranged beyond the longitudinal seam-forming station 1004, the apparatus 1000 further comprises a first flat-folding station 1005. The first flat-folding station 1005 is designed to reduce the first angle 801 and the third angle 803 each to 0°, and to increase the second angle 802 and the fourth angle 804 each to 180°. For this purpose, the first flat-folding station 1005 comprises two pairs of contra-rotating rolls. In this case, the rolls of one pair are designed and arranged to press the first longitudinal fold in a gap between the rolls. The rolls of the further pair are designed and arranged to press the third longitudinal fold in a gap between the rolls.

Figure 11:
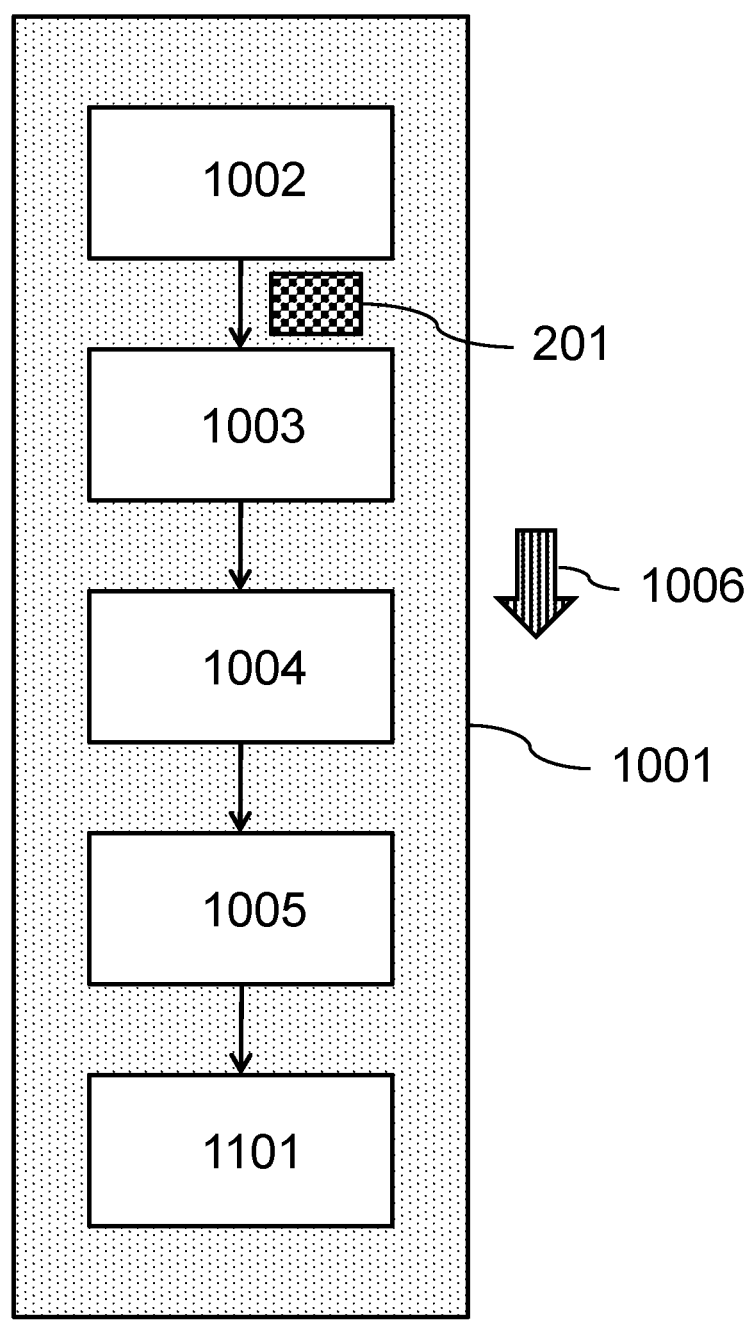
FIG. 11 a further apparatus according to the invention.

FIG. 11 shows a further apparatus 1000 of the invention. The apparatus 1000 according to FIG. 11 is designed like the apparatus 1000 according to FIG. 10, wherein the apparatus 1000 according to FIG. 11 further comprises a second flat-folding station 1101. The second flat-folding station 1101 is arranged beyond the first flat-folding station 1005 in the transport direction 1006. The second flat-folding station 1101 is designed to increase the first angle 801 and the third angle 803 each to 180° and to reduce the second angle 802 and the fourth angle 804 each to 0°. For this purpose, the second flat-folding station 1101 comprises two pairs of contra-rotating rolls. In this case, the rolls of one pair are designed and arranged to press the second longitudinal fold in a gap between the rolls. The rolls of the further pair are designed and arranged to press the fourth longitudinal fold in a gap between the rolls. In addition, the transport unit 1001 in the transport direction 1006 downstream of the longitudinal seam-forming station 1004 up to and including the second flat-folding station 1101 is designed as a conveyor belt 1001.

FIG. 12 shows a test setup 1200 for measurement of the shaping force. In this setup, the container precursor 800 according to FIG. 8 is clamped between two compression plates 1201 of a compression plate system of a universal strength tester. The compression plate system is motor-driven, such that the upper compression plate 1201 can perform a uniform downward motion 1202. As a result, shaping 1203 of the container precursor 800 from the flat-folded state takes place to give a sleeve structure. Further details relating to the measurement are reported under the "Shaping force" test method.

Figure 13:
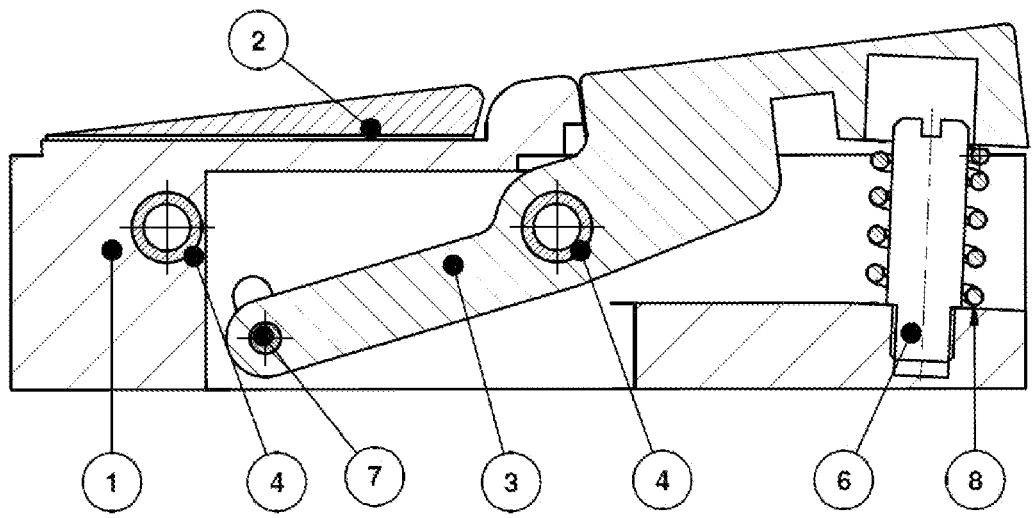
FIG. 13a) a holding clamp.
FIG. 13b) the holding clamp according to FIG. 13a) in a further view.
Figure 13:
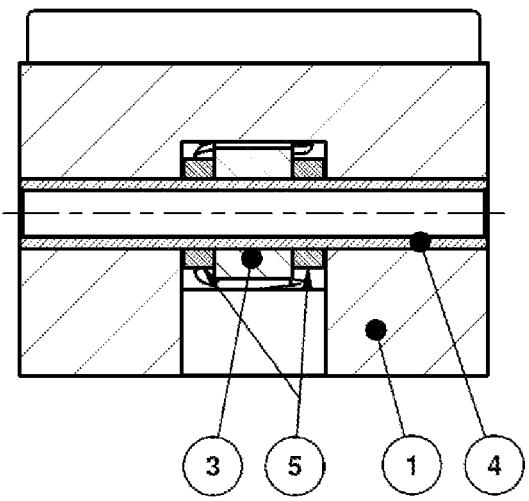

FIG. 13a) shows a holding clamp 1300. The holding clamp 1300 was developed in-house and serves to conduct the above-described test method for the zero sample force. FIG. 13a) shows a section A-A through the holding clamp 1300. The holding clamp 1300 more particularly comprises a holding plate 1, a clamp 2, a lever 3, a shell 4, a spacer ring 5, a bolt 6, a cylinder pin 7 and a compression spring 8.

FIG. 13b) shows the holding clamp 1300 according to FIG. 13a) in a further view. What is shown is a section B-B through the holding clamp 1300.

Figure 14:
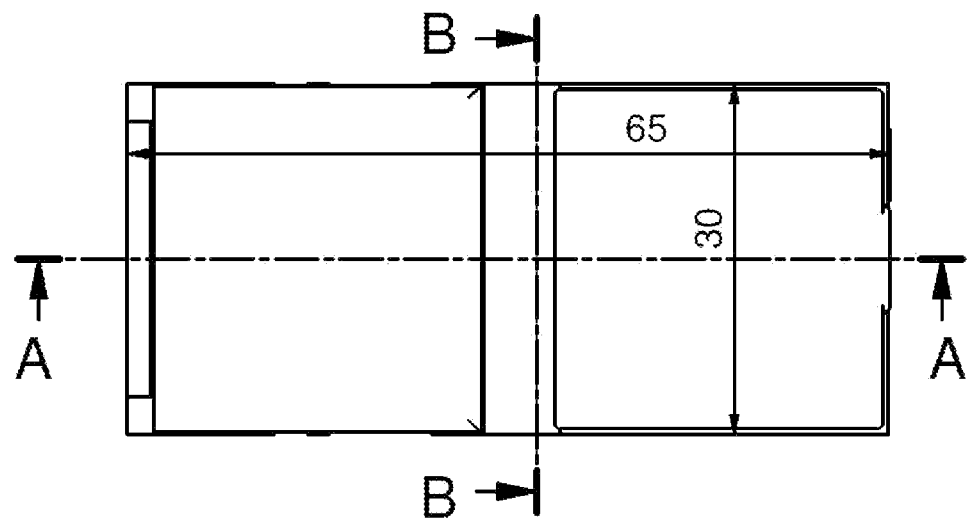
FIG. 14a) the holding clamp according to FIG. 13a) in a further view.
FIG. 14b) the holding clamp according to FIG. 13a) with a turntable.
Figure 14:
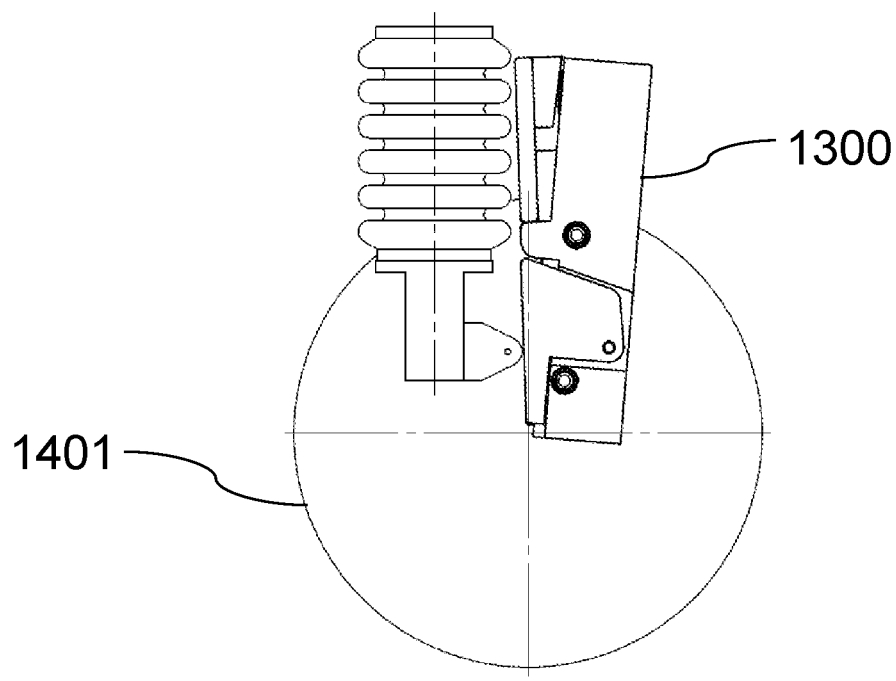

FIG. 14a) shows the holding clamp 1300 according to FIG. 13a) in a further view with dimensions in mm.

FIG. 14b) shows the holding clamp 1300 according to FIG. 13a) with a turntable 1401. The holding clamp 1300 and the turntable 1401 are used in this arrangement for the "zero sample force" test method as described above.

Figure 15:
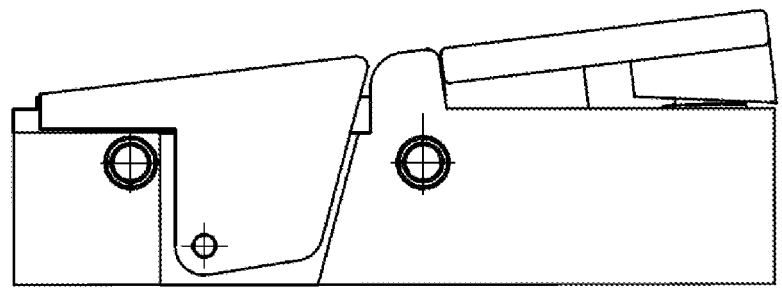
FIG. 15a) the holding clamp according to FIG. 13a) in a further view.
FIG. 15b) the holding clamp according to FIG. 13a) in a further view.
Figure 15:
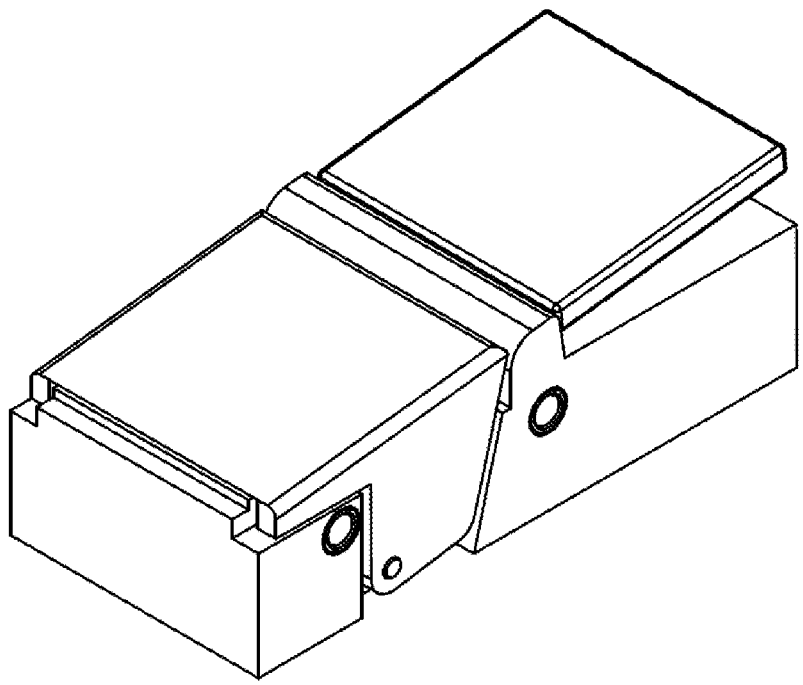

FIG. 15a) shows the holding clamp 1300 according to FIG. 13a) in a further view.

FIG. 15b) shows the holding clamp 1300 according to FIG. 13a) in a perspective view.

FIG. 16 shows the sheet-like composite 201 from method step a) 101 of the method 100 according to FIG. 1 in a view of the inner face 202. This shows, from left to right, across the sheet-like composite 201: the first longitudinal edge 208, the first longitudinal crease 204, the second longitudinal crease 205, the third longitudinal crease 206, the fourth longitudinal crease 207 and the further longitudinal edge 209.

Figure 17:
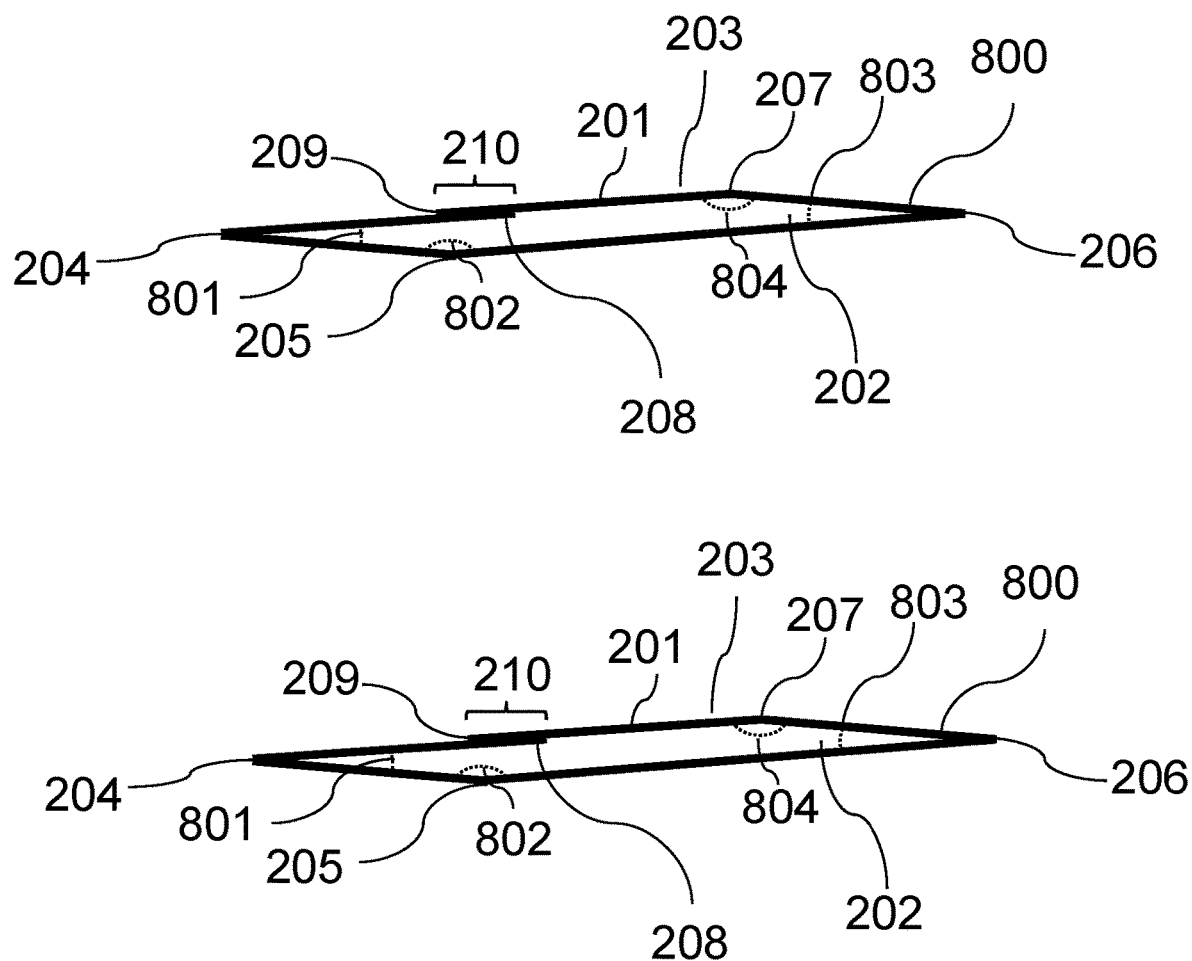
FIG. 17 a multitude of container precursors.

FIG. 17 shows a multitude of container precursors 800. This multitude consists of 2, and thus multiple, container precursors 800.

LIST OF REFERENCE NUMERALS 100 method according to the invention
101 method step a)
102 method step b)
103 method step c)
104 method step d)
105 method step e)
106 method step B.
201 sheet-like composite
202 inner face
203 outer face
204 first longitudinal crease
205 second longitudinal crease
206 third longitudinal crease
207 fourth longitudinal crease
208 first longitudinal edge
209 further longitudinal edge
210 longitudinal seam
401 method step f)
601 inner polymer layer
602 barrier layer
603 adhesion promoter layer
604 carrier layer
605 outer polymer layer
606 colour layer/decoration
701 sublayer
702 cavity
800 container precursor according to the invention
801 first angle
802 second angle
803 third angle
804 fourth angle
901 longitudinal edge
902 crease
903 top region
904 base region
905 hole
906 hole-covering layers
1000 apparatus according to the invention
transport unit
1002 first folding station
1003 second folding station
1004 longitudinal seam-forming station
1005 first flat-folding station
1006 transport direction
second flat-folding station
1200 test setup for measurement of the shaping force
compression plate
1202 uniform compression plate motion
1203 shaping
1300 holding clamp
1 holding plate
2 clamp
3 lever
4 shell
spacer ring
6 bolt
7 cylinder pin
8 compression spring
1401 turntable
1701 method step B
1702 multitude of container precursors
1703 packaging

The invention claimed is:

1. A method comprising, as method steps,

A. providing multiple container precursors, wherein the providing of the container precursors in each case comprises:

a) providing a sheet-like composite comprising, as mutually superposed layers of a layer sequence, from an inner face of the sheet-like composite to an outer face of the sheet-like composite:

i) an inner polymer layer,
ii) a barrier layer, and
iii) a carrier layer, wherein the sheet-like composite includes a first longitudinal edge and a further longitudinal edge, wherein the first longitudinal edge lies opposite the further longitudinal edge, wherein the sheet-like composite includes, in the following sequence in the direction from the first longitudinal edge to the further longitudinal edge:

i. a first longitudinal crease,
ii. a second longitudinal crease,
iii. a third longitudinal crease, and
iv. a fourth longitudinal crease;

b) producing a first longitudinal fold along the first longitudinal crease and a third longitudinal fold along the third longitudinal crease,
wherein the first longitudinal fold is characterized by a first angle,
wherein the third longitudinal fold is characterized by a third angle,
wherein the production of the first longitudinal fold and of the third longitudinal fold comprises initially reducing the first angle and the third angle each from more than 65 degrees to not more than 65 degrees and then increasing the first angle and the third angle each from the not more than 65 degrees to at least 165 degrees;
c) producing a second longitudinal fold along the second longitudinal crease and a fourth longitudinal fold along the fourth longitudinal crease,
wherein the second longitudinal fold is characterized by a second angle,
wherein the fourth longitudinal fold is characterized by a fourth angle,
wherein the production of the second longitudinal fold and of the fourth longitudinal fold comprises reducing the second angle and the fourth angle from more than 15 degrees to not more than 15 degrees;
d) contacting and joining the first longitudinal edge to the further longitudinal edge thereby obtaining a longitudinal seam; and
e) reducing the first angle and the third angle each from the at least 165 degrees to not more than 15 degrees and increasing the second angle and the fourth angle each from the not more than 15 degrees to at least 165 degrees; and
B. at least partly enveloping the multiple container precursors with a packaging,
wherein the first angle, the second angle, the third angle and the fourth angle are each on the inner face of the sheet-like composite,
wherein producing a fold along a crease comprises forming an angle with fold regions of the sheet-like composite that are adjacent along the crease, wherein the angle differs by at least 10 degrees from 180 degrees for a first time as a result of folding.

2. The method according to claim 1, wherein the method further comprises a method step f) between method steps e) and B., wherein, in method step f), the first angle and the third angle are each increased from the not more than 15 degrees to at least 165 degrees and the second angle and the fourth angle are each reduced from the at least 165° to not more than 15 degrees.

3. The method according to claim 1, wherein the sheet-like composite further includes an outer polymer layer,
wherein the outer polymer layer superposes the carrier layer on a side of the carrier layer remote from the barrier layer.

4. A packaging and multiple container precursors, the multiple container precursors being obtainable by the method according to claim 1,
wherein the packaging at least partially envelopes the multiple container precursors.

5. The packaging according to claim 4, wherein the first angle and the third angle of at least a portion of the multiple container precursors are each at least 165 degrees;
wherein the second angle and the fourth angle of at least the portion of the multiple container precursors, are each not more than 15 degrees;
wherein the container precursor of the portion of the container precursors can each be shaped to give a sleeve-like structure by folding along the first longitudinal crease, the second longitudinal crease, the third longitudinal crease and the fourth longitudinal crease;
wherein the container precursors of the portion of the container precursor are each characterized by a shaping coefficient in a range from 8 to 30 $m^2$/kg,
wherein the shaping coefficient is defined by Shaping coefficient=shaping force/(zero sample force×grammage), wherein the zero sample force is determined according to DIN 55437-3:2008-05 and DIN 53121:2014-08 as a maximum force value which is obtained by bending uncreased samples of the sheet-like composite, with a sample size of 60 mm×25 mm, by 150° using a crease-bend tester, wherein the shaping force is determined by a compression test method according to DIN EN ISO 12048:2000 using a strength testing machine.

6. The packaging according to claim 4, wherein the first angle and the third angle of at least a portion of the multiple container precursors are each not more than 15 degrees,
wherein the second angle and the fourth angle of at least the portion of the multiple container precursors are each at least 165 degrees,
wherein each container precursor of the portion of the container precursors can be shaped by folding along the first longitudinal crease, the second longitudinal crease, the third longitudinal crease and the fourth longitudinal crease to give a sleeve-like structure;
wherein the container precursors of the portion of the container precursors are each characterized by a shaping coefficient in a range from 8 to 30 $m^2$/kg,
wherein the shaping coefficient is defined by Shaping coefficient=shaping force/(zero sample force×grammage), wherein the zero sample force is determined according to DIN 55437-3:2008-05 and DIN 53121:2014-08 as maximum force value which is obtained by bending uncreased samples of the sheet-like composite with a sample size of 60 mm×25 mm by 150° using a crease-bend tester,
wherein the shaping force is determined by a compression test method according to DIN EN ISO 12048:2000 using a strength testing machine.

* * * * *